(12) United States Patent
Takagi

(10) Patent No.: US 12,515,317 B2
(45) Date of Patent: Jan. 6, 2026

(54) CONTINUUM ROBOT, CONTROL METHOD OF THE SAME, AND STORAGE MEDIUM

(71) Applicant: CANON KABUSHIKI KAISHA, Tokyo (JP)

(72) Inventor: Kiyoshi Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 333 days.

(21) Appl. No.: 18/066,134

(22) Filed: Dec. 14, 2022

(65) Prior Publication Data

US 2023/0114672 A1 Apr. 13, 2023

Related U.S. Application Data

(63) Continuation of application No. PCT/JP2021/023313, filed on Jun. 21, 2021.

(30) Foreign Application Priority Data

Jun. 23, 2020 (JP) ................................. 2020-107933
Jun. 15, 2021 (JP) ................................. 2021-099452

(51) Int. Cl.
*B25J 9/16* (2006.01)
*B25J 9/06* (2006.01)
*B25J 18/06* (2006.01)

(52) U.S. Cl.
CPC ............. *B25J 9/1625* (2013.01); *B25J 9/065* (2013.01); *B25J 9/1635* (2013.01); *B25J 18/06* (2013.01)

(58) Field of Classification Search
CPC ........ B25J 9/1625; B25J 9/065; B25J 9/1635; B25J 18/06
See application file for complete search history.

(56) References Cited

U.S. PATENT DOCUMENTS

2012/0271109 A1* 10/2012 Belson ................. A61B 1/0051
 600/142
2016/0174816 A1* 6/2016 Choset ............... A61B 1/00006
 600/142

(Continued)

FOREIGN PATENT DOCUMENTS

CN 101416867 A 4/2009
CN 101455554 A 6/2009

(Continued)

*Primary Examiner* — Jason Holloway
*Assistant Examiner* — Christopher Scott
(74) *Attorney, Agent, or Firm* — CANON U.S.A., INC. IP DIVISION

(57) ABSTRACT

In a wire-driven continuum robot, in accordance with a profile of a first bending angle regarding a bending angle of a follow-up bending section that corresponds to a forward movement of a continuum robot, and is set in accordance with an input first target bending angle of a distal bending section, a bending angle of the following-up bending section is controlled to reach the first target bending angle. Before a movement amount of a forward movement reaches a first movement amount, the control is performed as follows. More specifically, a profile of a second bending angle that is different from the profile of the first bending angle is set, and by a further forward movement of the continuum robot, a bending angle of the following-up bending section reaches the second target bending angle in accordance with the profile of the second bending angle.

8 Claims, 23 Drawing Sheets

(56) References Cited

U.S. PATENT DOCUMENTS

| | | | |
|---|---|---|---|
| 2017/0049298 A1* | 2/2017 | Hunter | A61B 5/067 |
| 2018/0243900 A1* | 8/2018 | Tanaka | B25J 9/065 |
| 2018/0296282 A1* | 10/2018 | Kose | A61B 1/0053 |
| 2019/0015978 A1* | 1/2019 | Takagi | B25J 9/065 |
| 2019/0321976 A1* | 10/2019 | Takagi | B25J 18/06 |

FOREIGN PATENT DOCUMENTS

| | | |
|---|---|---|
| CN | 102655802 A | 9/2012 |
| CN | 108366714 A | 8/2018 |
| CN | 108697303 A | 10/2018 |
| CN | 109414816 A | 3/2019 |
| CN | 110744547 A | 2/2020 |
| JP | 2018171701 A | 11/2018 |
| JP | 2019058648 A | 4/2019 |

\* cited by examiner

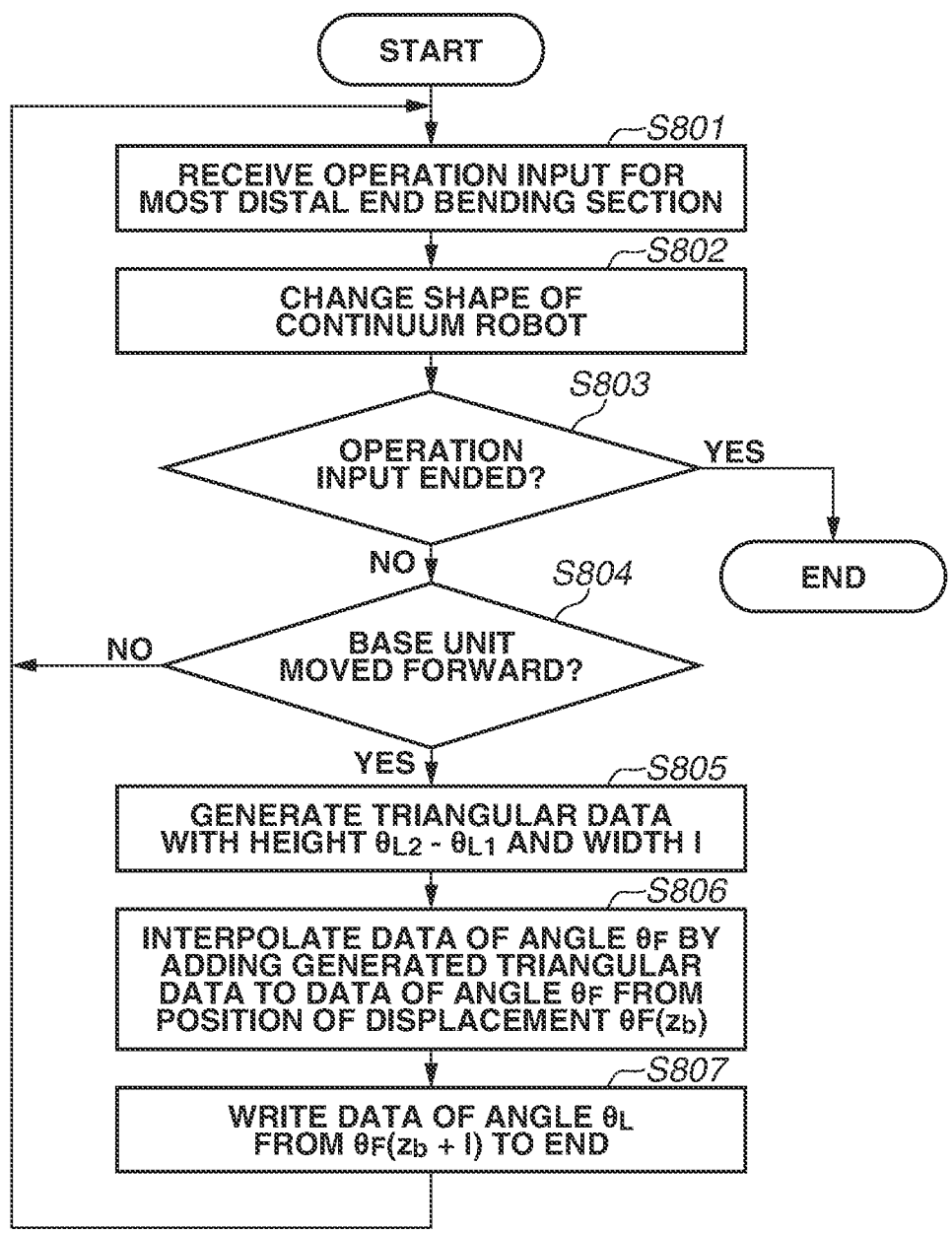

CONTINUUM ROBOT, CONTROL METHOD OF THE SAME, AND STORAGE MEDIUM

CROSS-REFERENCE TO RELATED APPLICATIONS

This application is a Continuation of International Patent Application No. PCT/JP2021/023313, filed Jun. 21, 2021, which claims the benefit of Japanese Patent Applications No. 2020-107933, filed Jun. 23, 2020, and No. 2021-099452, filed Jun. 15, 2021, all of which are hereby incorporated by reference herein in their entirety.

BACKGROUND OF THE INVENTION

Field of the Invention

The present invention relates to a control system of a continuum robot including a bendable portion provided with a plurality of bending sections configured to bend by a wire driving, a control method of the same, and a storage medium storing a program for causing a computer to function as the control system.

Background Art

The continuum robot is also called a continuum robot, and includes a bendable portion provided with a plurality of bending sections having a flexible structure. The shape of the continuum robot is controlled by the deformation of the bending sections. The continuum robot holds superiority mainly in two points over a rigid link robot including a rigid link. The first point of superiority lies in that the continuum robot can move along a curve line in a narrow space in which the rigid link robot is stuck, or in an environment with a scattering object. The second point of superiority lies in that the continuum robot can be operated without damaging a weak target object because the continuum robot has essential tenderness. The continuum robot does not always require the detection of external force, which is required by the rigid link robot. Utilizing this feature, the continuum robot is expected to be applied to the medical field such as a sheath or a catheter of an endoscope, and a robot for hazardous environments such as a rescue robot.

Patent Document 1 describes a control method for a continuum robot used as an endoscope, entering a space. Specifically, in Patent Document 1, a bending shape is continuously propagated by controlling a bending shape of a leading bending section to be propagated to a bending shape of a following bending section in accordance with the forward movement of a base unit of the continuum robot in all sets of neighboring bending sections.

CITATION LIST

Patent Literature

PTL 1: United States Patent Application Publication No. 2012/0271109

Patent Document 1 describes a control method of propagating the bending shape of the leading bending section to the following bending section every time the base unit of the continuum robot moves forward by a length of a bending section, but Patent Document 1 does not assume the propagation of a bending shape to the following bending section that is executed in a case where the bending shape of the leading bending section is changed when a displacement of the base unit is smaller than the length of the bending section. Thus, the technique described in Patent Document 1 has problems in that the operability of the continuum robot cannot be improved because a discrepancy between the intention of an operator and the shape of the continuum robot becomes larger, and it becomes difficult for the continuum robot to enter a target route.

SUMMARY OF THE INVENTION

The present invention has been devised in view of such a problematic point, and is directed to providing a structure that enables improvement in operability of a continuum robot.

According to an aspect of the present invention, a continuum robot includes a base unit, a distal bending section configured to bend by a wire for a distal section driving, a follow-up bending section that is provided between the distal bending section and the base unit, and configured to bend by a wire for a follow-up section driving, a driving unit configured to independently drive the wire for the distal section and the wire for the follow-up section, a moving unit configured to integrally move the base unit, the distal bending section, and follow-up bending section forward, and a control unit, wherein the control unit is configured to control, in accordance with a profile of a first bending angle regarding a bending angle of the follow-up bending section that corresponds to a forward movement of the continuum robot, and is set in accordance with an input first target bending angle of the distal bending section, a bending angle of the following-up bending section to reach the first target bending angle, and wherein, in a case where, after the distal bending section bends at the first target bending angle, the follow-up bending section bends and moves forward in accordance with the profile of the first bending angle, and before a displacement amount of a forward movement reaches a first displacement amount corresponding to a length of the follow-up bending section, a target bending angle of the distal bending section is changed from the first target bending angle to a second target bending angle, a profile of a second bending angle that is different from the profile of the first bending angle is set, and by a further forward movement of the continuum robot, a bending angle of the following-up bending section reaches the second target bending angle in accordance with the profile of the second bending angle.

In addition, the present invention includes a control method of a continuum robot that is to be executed by a control system of the above-described continuum robot, and a program for causing a computer to function as a control system of the above-described continuum robot.

Further features of the present invention will become apparent from the following description of exemplary embodiments with reference to the attached drawings.

BRIEF DESCRIPTION OF THE DRAWINGS

FIG. 8 is a flowchart illustrating an example of processing procedure of a control method of a continuum robot that is to be executed by a control system 10 of a continuum robot according to the first exemplary embodiment of the present invention.

DESCRIPTION OF THE EMBODIMENTS

Hereinafter, a mode for carrying out the present invention (exemplary embodiment) will be described with reference to the drawings. A specific continuum robot includes a base unit, a distal bending section configured to bend by a wire for a distal section driving, and a follow-up bending section that is provided between the distal bending section and the base unit, and configured to bend by a wire for a following-up section driving. The continuum robot further includes a driving unit configured to independently drive the wire for the distal section and the wire for the following-up section, a moving unit configured to integrally move the base unit, the distal bending section, and the follow-up bending section forward, and a control unit.

The control unit is configured to control, in accordance with a profile of a first bending angle regarding a bending angle of the follow-up bending section that corresponds to a forward movement of the continuum robot, and is set in accordance with an input first target bending angle of the distal bending section, a bending angle of a follow-up bending section to reach the first target bending angle.

In addition, in a case where, after the distal bending section bends at the first target bending angle, the follow-up bending section bends and moves forward in accordance with the profile of the first bending angle, and before a movement amount of the forward movement reaches a first movement amount corresponding to a length of the follow-up bending section, a target bending angle of the distal bending section is changed from the first target bending angle to a second target bending angle, the control unit performs control as follows.

More specifically, a profile of a second bending angle that is different from the profile of the first bending angle is set, and by a further forward movement of the continuum robot, a bending angle of the follow-up bending section reaches the second target bending angle in accordance with the profile of the second bending angle.

First of all, a first exemplary embodiment of the present invention will be described.

Figure 1A:
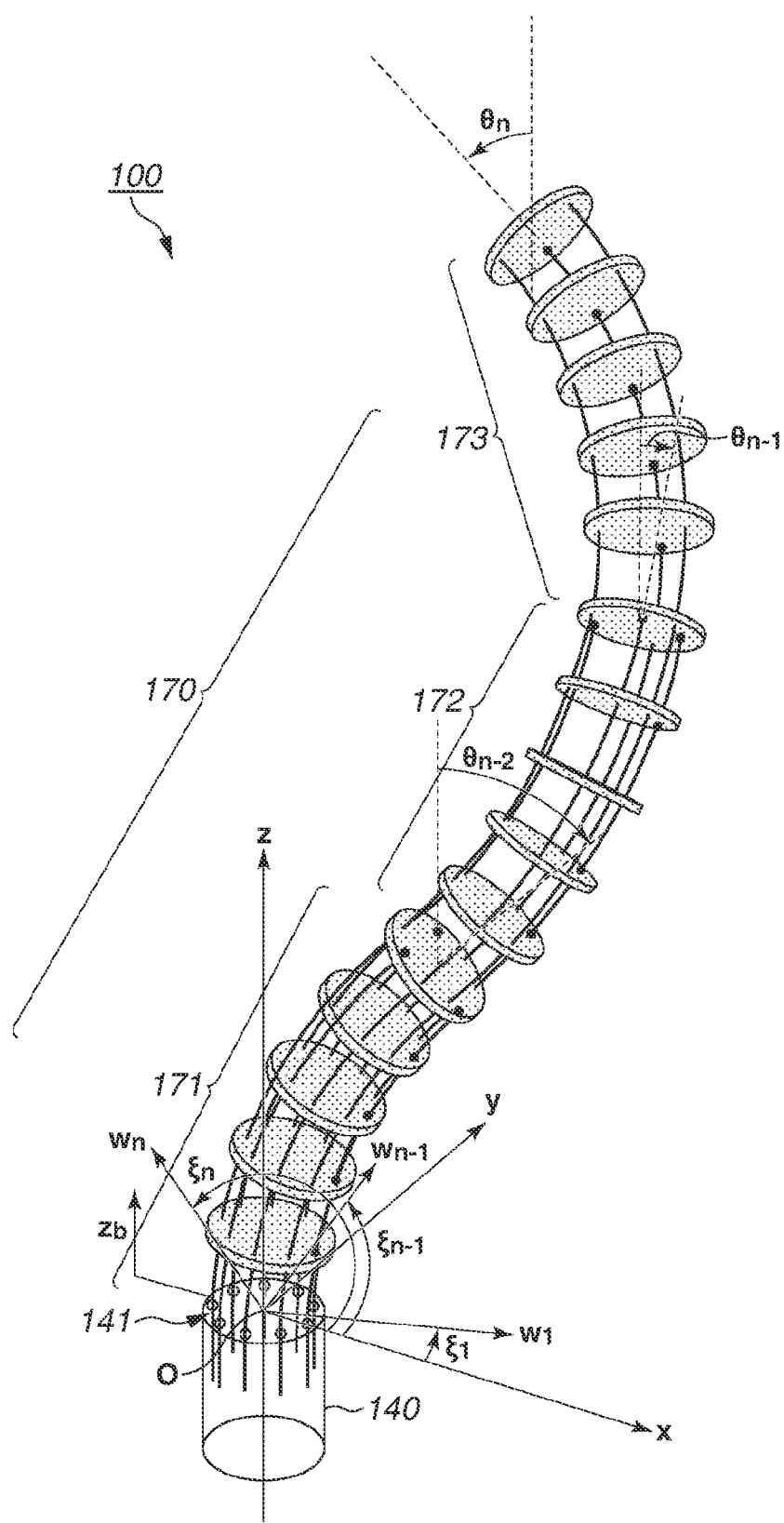
FIG. 1A is a diagram illustrating an example of a schematic configuration of a continuum robot according to a first exemplary embodiment of the present invention.

FIG. 1A is a diagram illustrating an example of a schematic configuration of a continuum robot 100 according to the first exemplary embodiment of the present invention. FIG. 1A illustrates a base unit 140 and a bendable portion 170 as one configuration of the continuum robot 100.

The bendable portion 170 is a component provided with a plurality of bending sections 171 to 173 configured to bend by wires (linear members) driving (component provided with a plurality of bending sections). Specifically, FIG. 1A illustrates n bending sections corresponding to an (n−2)-th the bending section 171, an (n−1)-th bending section 172, and an n-th bending section 173. In addition, in FIG. 1A, a bending angle of the bending section 173 is denoted by $\theta_n$, a bending angle of the bending section 172 is denoted by $\theta_{n-1}$, and a bending angle of the bending section 171 is denoted by $\theta_{n-2}$. The base unit 140 is a component supporting the bendable portion 170. Actuators (not illustrated in FIG. 1A) being a driving unit (driving unit) for independently driving the wires for the bending sections 171 to 173 are provided inside the base unit 140. In addition, FIG. 1A illustrates an xyz coordinate system in which an origin O is set to a predetermined position (e.g., center position) on a top surface 141 of the base unit 140, a traveling direction of the continuum robot 100 (e.g., forward movement direction) is set to a z direction, and mutually-orthogonal directions orthogonal to the z direction are set to an x direction and a y direction. In this manner, in addition to a bending operation executed by the plurality of bending sections 171 to 173 included in the bendable portion 170 of the continuum robot 100, the bending sections 171 to 173 and the base unit 140 can be integrally moved in the z direction (moved forward) by a position-controlled slider (moving unit). At this time, FIG. 1A illustrate a displacement $z_b$ of the base unit 140 as an index indicating a movement amount in the z direction of the continuum robot 100 (forward movement amount, displacement amount).

Hereinafter, a most distal bending section being a leader in the continuum robot will be sometimes described as an example of a distal bending section. Hereinafter, a following bending section continuous to the most distal bending section will be sometimes described as an example of a follow-up bending section.

In FIG. 1A, the bending section 173 is a most distal bending section existing at a position most distant from the base unit 140 among the plurality of bending sections 171 to 173 included in the bendable portion 170. The bending section 172 (the same applies to the bending section 171) is a following bending section that is positioned between the base unit 140 and the bending section 173 being a most distal bending section, and follows the bending section 173 being a most distal bending section, when the continuum robot 100 moves forward. When the continuum robot 100 moves forward (a positive z direction in FIG. 1A), the bending section 173 being a most distal bending section becomes a leading bending section.

Figure 1B:
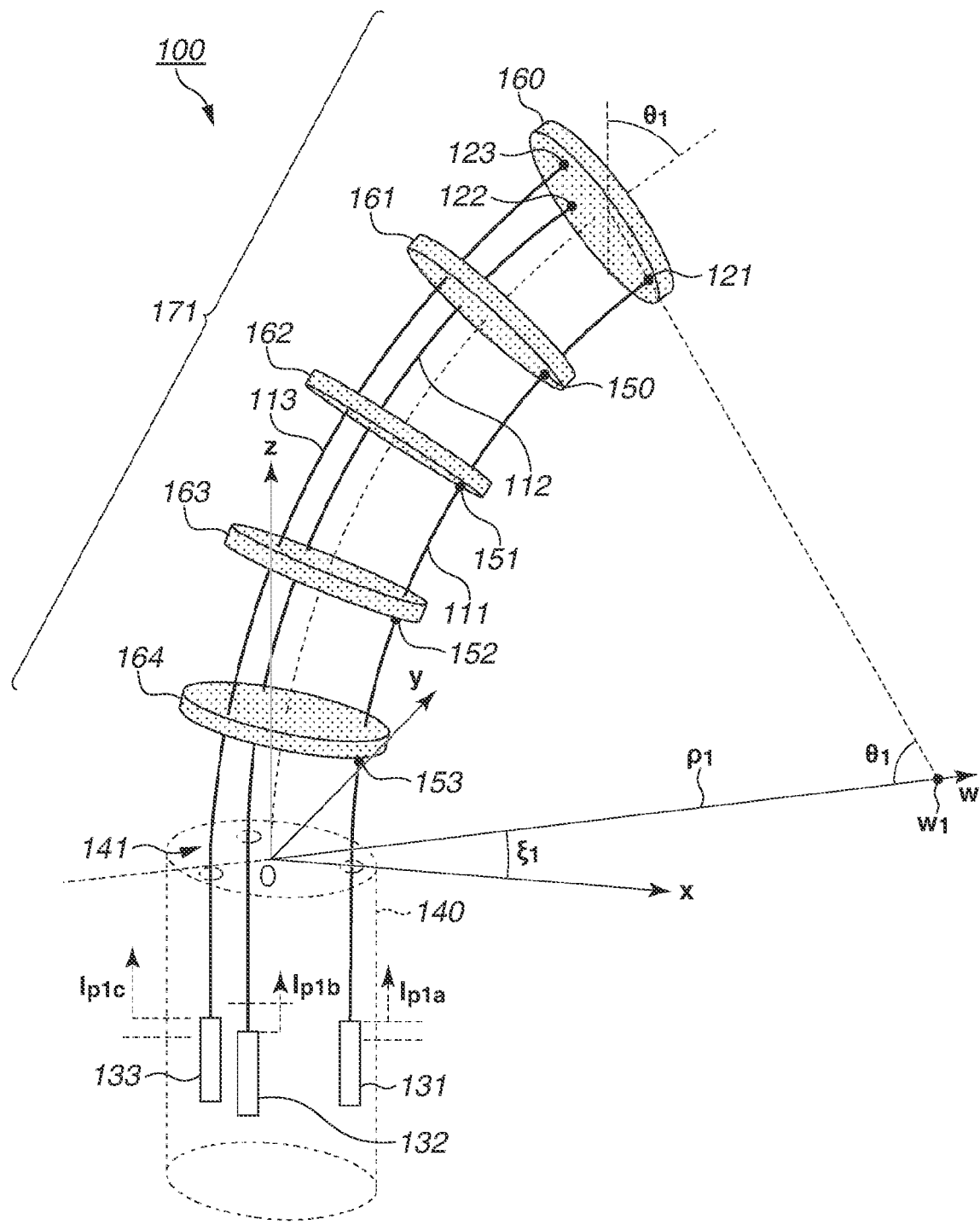
FIG. 1B is a diagram illustrating an example of a detailed schematic configuration of one bending section of the schematic configuration of the continuum robot illustrated in FIG. 1A.

FIG. 1B is a diagram illustrating an example of a detailed schematic configuration of one bending section 171 of the schematic configuration of the continuum robot 100 illustrated in FIG. 1A. In other words, FIG. 1B illustrates a detailed schematic configuration of the bending section 171 being a proximal end bending section existing at a position closest to the base unit 140. In FIG. 1B, components similar to the components illustrated in FIG. 1A are assigned the same reference numerals, and the detailed description thereof will be omitted. In FIG. 1B, a bending angle of the bending section 171 is denoted by $\theta_1$, a traverse angle of the bending section 171 is denoted by $\zeta_1$, and a curvature radius of the bending section 171 (corresponding to a line segment connecting a point O and a point w1 in FIG. 1B) is denoted by $\rho_1$.

The orientation (bending shape) of the continuum robot 100 is controlled by wires (linear members) 111 to 113 being connected to connection portions 121 to 123 at a distal end 160 of the bending section 171, and the wires 111 to 113 being pushed or pulled by respective actuators 131 to 133 installed inside the base unit 140. Here, the actuator 131 is a driving unit for driving the wire 111, the actuator 132 is a driving unit for driving the wire 112, and furthermore, the actuator 133 is a driving unit for driving the wire 113.

The continuum robot 100 also includes, in the bending section 171, wire guides 161 to 164 being members for guiding the wires 111 to 113. As the wire guides 161 to 164, an accordion-shaped or mesh continuum member may be used aside from a method of discretely arranging a plurality of members. The wire guides 161 to 164 are fixed to the wire 111 at fixing portions 150 to 153. In FIG. 1B, a central axis of the continuum robot 100 is also indicated by a broken line.

In the present exemplary embodiment, the wires 111 to 113 will be referred to as an a wire, a b wire, and a c wire in a counterclockwise direction on the xy-plane. Specifically, in the example illustrated in FIG. 1B, the wire 111 corresponds to the a wire, and a drive displacement of the wire 111 that is caused by the actuator 131 for the bending section 171 pushing or pulling the wire 111 is denoted by $l_{p1a}$. In the example illustrated in FIG. 1B, the wire 112 corresponds to the b wire, and a drive displacement of the wire 112 that is caused by the actuator 132 for the bending section 171 pushing or pulling the wire 112 is denoted by $l_{p1b}$. Furthermore, in the example illustrated in FIG. 1B, the wire 113 corresponds to the c wire, and a drive displacement of the wire 113 that is caused by the actuator 133 for the bending section 171 pushing or pulling the wire 113 is denoted by $l_{p1c}$.

In the example illustrated in FIG. 1B, the description has been given with reference to the detailed schematic configuration of the bending section 171 only. In this point, similarly to the detailed schematic configuration of the bending section 171 illustrated in FIG. 1B, the bending section 172 and the bending section 173 illustrated in FIG. 1A each include wires equivalent to the wires (linear member) 111 to 113, actuators equivalent to the actuators 131 to 133, a distal end equivalent to the distal end 160, and wire guides equivalent to the wire guides 161 to 164. As generalization, drive displacements of wires driving an n-th bending section are denoted by $l_{pna}$, $l_{pnb}$, and $l_{pnc}$.

Figure 2:
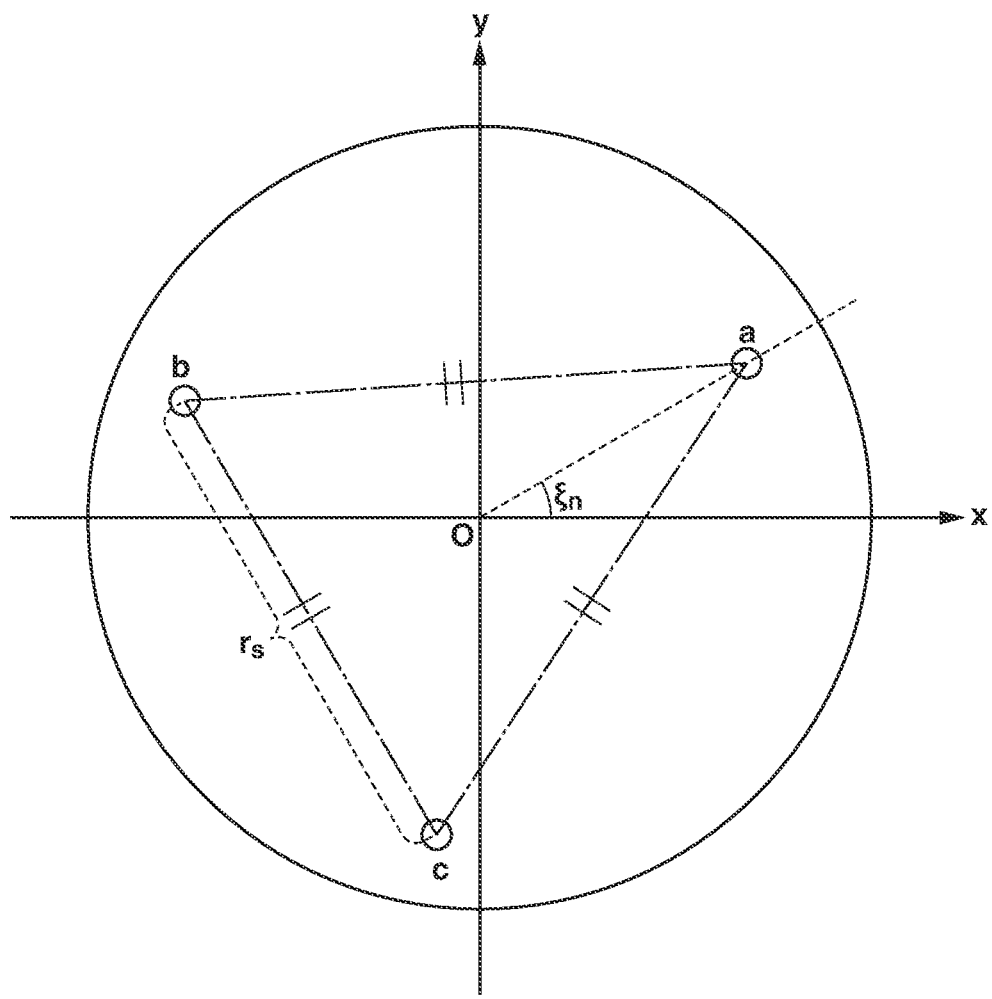
FIG. 2 is a diagram illustrating an example of arrangement on an xy-plane of three wires (a to c wires) illustrated in FIG. 1B.

FIG. 2 is a diagram illustrating an example of arrangement on the xy-plane of the three wires 111 to 113 (the a to c wires) illustrated in FIG. 1B. As illustrated in FIG. 2, the three wires 111 to 113 (the a to c wires) illustrated in FIG. 1B are arranged at vertices of a regular triangle having a length of one side being denoted by $r_s$, and a phase angle $\xi_n$ illustrated in FIG. 2 is an angle for determining the arrangement of wires driving an n-th bending section.

Figure 3:
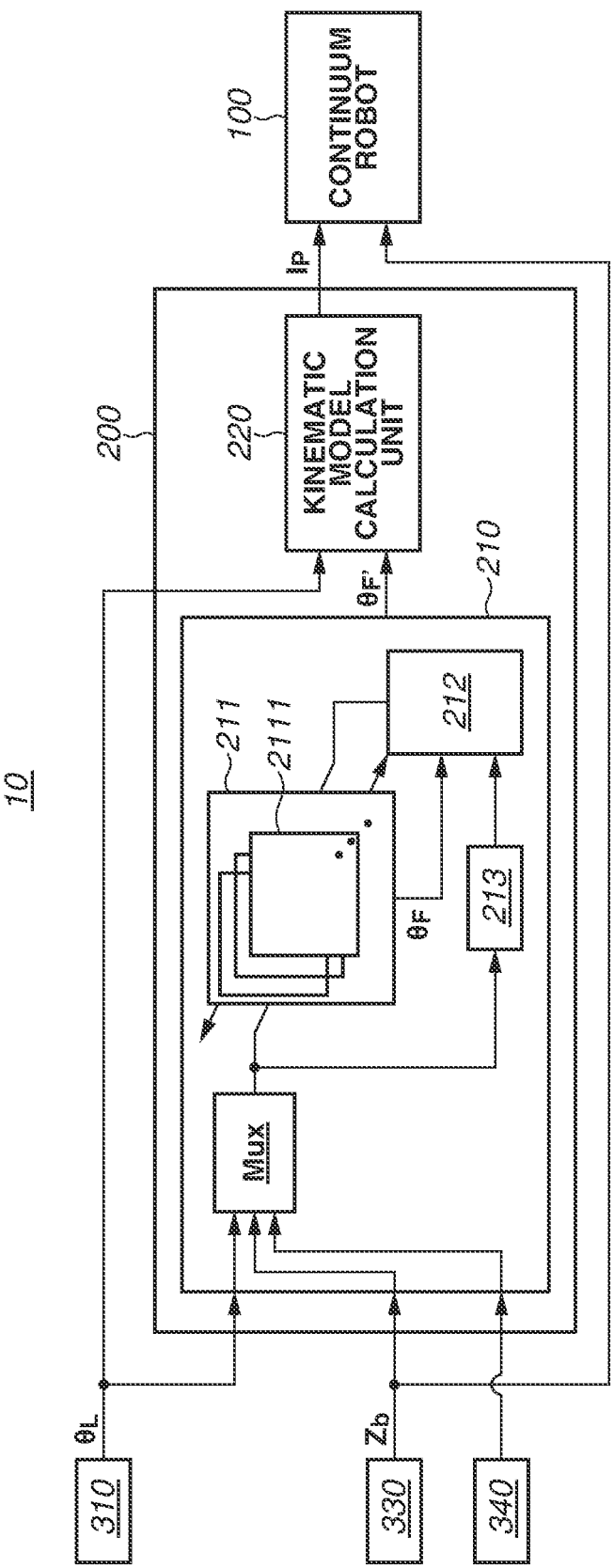
FIG. 3 is a diagram illustrating an example of a schematic configuration of a control system of a continuum robot according to the first exemplary embodiment of the present invention.

FIG. 3 is a diagram illustrating an example of a schematic configuration of a control system 10 of a continuum robot according to the first exemplary embodiment of the present invention. As illustrated in FIG. 3, the control system 10 of the continuum robot includes the continuum robot 100, a continuum robot control device 200 (control unit), and various input devices 310 and 330 to 340.

The input device 310 is a device that inputs a target bending angle $\theta_L$ of a most distal bending section to the continuum robot control device 200. Specifically, in the example illustrated in FIG. 1A, the input device 310 inputs a target bending angle $\theta_n$ of the bending section 173 being a most distal bending section, to a following bending angle calculation unit 210 and a kinematic model calculation unit 220 of the continuum robot control device 200 as the target bending angle $\theta_L$ of the most distal bending section. The input device 310 may further input a target traverse angle $\lambda_L$ of the most distal bending section to the continuum robot control device 200 in addition to the target bending angle $\theta_L$ of the most distal bending section.

The input device 330 is a device that inputs a displacement $z_b$ of the base unit 140 in the traveling direction (e.g., forward movement direction) of the continuum robot 100 to the continuum robot control device 200, and performs control to move the base unit 140 of the continuum robot 100 in the z direction by the displacement $z_b$. By the control, it is possible to integrally move a base unit and a plurality of bending sections forward.

The input device 340 is a device that inputs various types of information to the continuum robot control device 200. Specifically, the input device 340 inputs information regarding a length l (may include a length of the bending section 171) of the bending section 172 being a following bending section, for example, and instruction information regarding a reference table 2111 to be used, to an information input unit 213 of the continuum robot control device 200.

As illustrated in FIG. 3, the continuum robot control device 200 includes the following bending angle calculation unit 210 and the kinematic model calculation unit 220.

The following bending angle calculation unit 210 is a calculation unit that calculates a target bending angle $\theta_F'$ of a following bending section that is obtained after a change caused in accordance with a change in the target bending angle $\theta_L$ of the most distal bending section, based on the target bending angle $\theta_L$ of the most distal bending section that has been input from the input device 310, a target bending angle $\theta_F$ of the following bending section, the displacement z of the base unit 140 that has been input from the input device 330, and the length l of the following bending section that has been input from the input device 340. As illustrated in FIG. 3, the following bending angle calculation unit 210 includes a multiplexer Mux, a storage unit 211, a reference table rewriting unit 212, and the information input unit 213. The storage unit 211 is a storage unit storing a plurality of different reference tables 2111 indicating a relationship between the target bending angle $\theta_L$ of the most distal bending section and the target bending angle $\theta_F$ of the following bending section, and the displacement $z_b$ of the base unit 140, and various types of information necessary for processing in the following bending angle calculation unit 210. The information input unit 213 is an information input unit that inputs, to the reference table rewriting unit 212, information regarding the length l of the following bending section that has been input from the input device 340 via the multiplexer Mux, and instruction information regarding the reference table 2111 to be used. The reference table rewriting unit 212 is a rewriting unit that selects one reference table 2111 to be used, from among the plurality of reference tables 2111 stored in the storage unit 211, based on information input from the information input unit 213, and rewrites the selected reference table 2111 in accordance with the change in the target bending angle $\theta_L$ of the most distal bending section. The detailed processing example of the following bending angle calculation unit 210 described here will be described below with reference to FIGS. 7A and 7B.

The kinematic model calculation unit 220 is a calculation unit that calculates drive displacements caused when wires (linear members) of the following bending section are driven by the respective actuators being driving units, based on the changed target bending angle $\theta_F'$ of the following bending section that has been calculated by the following bending angle calculation unit 210. In addition, the kinematic model calculation unit 220 calculates drive displacements caused when wires (linear members) of the most distal bending section are driven by the respective actuators being driving units, based on the target bending angle $\theta_L$ of the most distal bending section that has been input by the input device 310. FIG. 3 collectively illustrates, as the drive displacement $l_p$ of the wires, the drive displacements of the wires of the most distal bending section and the drive displacements of the wires of the following bending section that have been obtained by the kinematic model calculation unit 220 through calculation. Then, the continuum robot 100 according to the present exemplary embodiment performs bending control of the most distal bending section and the following bending section in accordance with the drive displacement $l_p$ of each wire.

In the present exemplary embodiment, all phase angles illustrated in FIG. 2 are set to $\xi_n=0$, and leader follow-up control on an xz-plane will be initially described below.

1) Modeling

In this chapter, a kinematic model on the xz-plane of the continuum robot 100 is derived.

The definition of symbols to be used in this chapter is given below.

$l_n$: a length of an arm casing of an n-th bending section
$r_n$: a distance between the a wire and the b wire on the xz-plane
e: the number of bending sections of the bendable portion 170 of the continuum robot 100
$\theta_n$: a bending angle (at a distal end) of the n-th bending section
$\rho_n$: a curvature radius of the n-th bending section
$\theta_{refn}$: a target bending angle (at a distal end) of the n-th bending section
$l_{pn}$: drive displacements of wires of the n-th bending section
$x_{tn}, z_{tn}$: coordinates (at a distal end) of the n-th bending section
$z_b$: a displacement of the base unit 140

Figure 4:
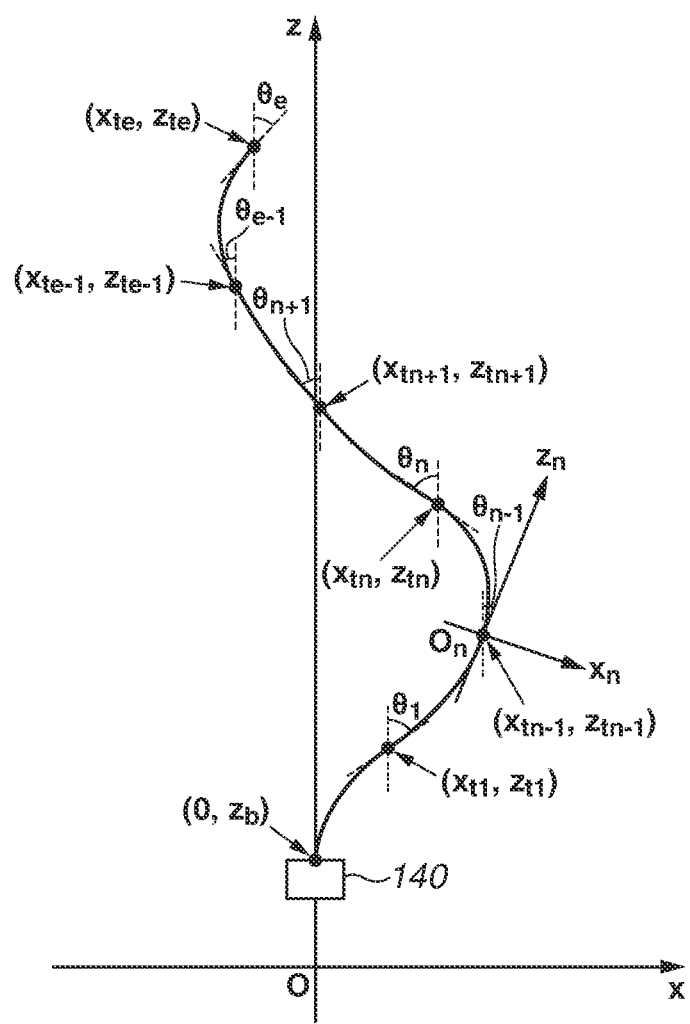
FIG. 4 is a diagram illustrating the first exemplary embodiment of the present invention, and illustrating an example of a kinematic model of the continuum robot illustrated in FIG. 1A.
Figure 5:
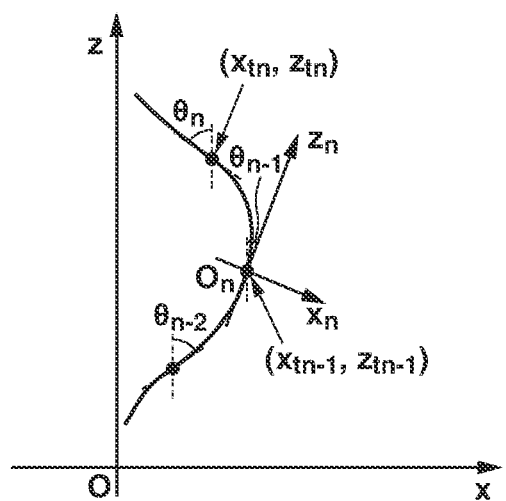
FIG. 5 is a diagram illustrating the first exemplary embodiment of the present invention, and illustrating an example of a kinematic model of the continuum robot illustrated in FIG. 1A.

FIGS. 4 and 5 are diagrams illustrating the first exemplary embodiment of the present invention, and each illustrating an example of a kinematic model of the continuum robot 100 illustrated in FIG. 1A.

In this example, a kinematic model of the continuum robot 100 having the number of bending sections being n that is illustrated in FIG. 4 is derived based on the following presumption.

1. A wire deforms only on the xz-plane.
2. In each bending section, a wire deforms at a fixed curvature.
3. The torsional deformation of wires is not considered.
4. A wire does not deform in a longitudinal direction.

First of all, only a first bending section (corresponding to the bending section 171 in FIGS. 1A and 1B) will be considered.

When the a wire is driven and the b wire and the c wire are fixed, a relationship between the drive displacement $l_{p1}$ of the wire and a bending angle $\theta_1$ (at the distal end) of the first bending section is represented by the following formula (1).

[Math. 1]
$$l_{p1} = \frac{3}{2} r_1 \theta_1 \tag{1}$$

Next, a relationship between a drive displacement $l_{pn}$ of the wire of the n-th bending section, and a bending angle $\theta_n$ of the distal end thereof is derived. Here, n is set to a number equal to or larger than 2. A relative bending angle $\theta^-_n$ (at the distal end) of the n-th bending section is defined as follows.

$$\theta^-_n = \theta_n - \theta_{n-1} \tag{2}$$

Then, as illustrated in FIG. 5, when the coordinates of the origin O are set to $(x_{tn-1}, z_{tn-1})$, and a relative coordinate system $x_n$-$z_n$ in a $\theta_{n-1}$ direction and an orthogonal direction thereof is set, a relationship between the drive displacement $\tilde{l}_{pn}$ of the wire in the relative coordinate system $x_n$-$z_n$ and the relative bending angle $\tilde{\theta}_{pn}$ (at the distal end) of the n-th bending section is represented by the following formula (3). In the following formula (3), "~" of "$\tilde{l}_{pn}$" is described above "l" and "~" of "$\tilde{\theta}_n$" is described above "$\theta$".

[Math. 2]

$$\tilde{l}_{pn} = \frac{3}{2} r_n \tilde{\theta}_n \qquad (3)$$

The drive displacement $l_{pn}$ of the wires of the n-th bending section becomes the sum of displacements of wires for driving the n-th bending section in the relative coordinate system from the first bending section to the (n−1)-th bending section, and is represented by the following formula (4).

[Math. 3]

$$l_{pn} = \frac{3}{2} r_n (\tilde{\theta}_n + \tilde{\theta}_{n-1} + \ldots + \theta_1) = r_n \theta_n \qquad (4)$$

It can be accordingly seen that the bending angle $\theta_n$ at the distal end of the n-th bending section is determined based only on the drive displacement $l_{pn}$ of the wires, and does not depend on an angle of a midway bending section.

Next, a relationship between a bending angle at the distal end of the n-th bending section and the coordinates of the distal end is derived. First of all, when the first bending section is considered, a relationship between a bending angle $\theta_1$ at the distal end of the first bending section and coordinates $(x_{t1}, z_{t1})$ of the distal end is represented by the following formulae (5) and (6).

[Math. 4]

$$x_{t1} = \frac{l_1}{\theta_1}(1 - \cos\theta_1) \qquad (5)$$

$$z_{t1} = \frac{l_1}{\theta_1}\sin\theta_1 \qquad (6)$$

Next, a relationship between a relative bending angle $\tilde{\theta}_n$, at the distal end of the n-th bending section and coordinates $(\tilde{x}_{tn}, \tilde{z}_{tn})$ of the distal end in the relative coordinate system $x_n$-$z_n$ is represented by the following formulae (7) to (9). Here, n is set to a number equal to or larger than 2. In the following formulae (7) and (8), "~" of "0" is described above "$\theta$" and "~" in "$x_{tn}$ and $z_{tn}$" is described above "x" and "z".

[Math. 5]

$$\tilde{x}_{tn} = \frac{l_n}{\tilde{\theta}_n}(1 - \cos\tilde{\theta}_n) \qquad (7)$$

$$\tilde{z}_{tn} = \frac{l_n}{\tilde{\theta}_n}\sin\tilde{\theta}_n \qquad (8)$$

-continued $$\begin{bmatrix} x_{tn} \\ z_{tn} \end{bmatrix} = \begin{bmatrix} x_{t1} \\ z_b + z_{t1} \end{bmatrix} + \sum_{m=2}^{n} \begin{bmatrix} \cos\theta_{m-1} & \sin\theta_{m-1} \\ -\sin\theta_{m-1} & \cos\theta_{m-1} \end{bmatrix} \begin{bmatrix} \frac{l_m}{\tilde{\theta}_m}(1 - \cos\tilde{\theta}_m) \\ \frac{l_m}{\tilde{\theta}_m}\sin\tilde{\theta}_m \end{bmatrix} \qquad (9)$$

With this configuration, coordinates $(x_{tn}, z_{tn})$ of the distal end in an absolute coordinate system are represented using a rotation transform matrix.

2) Control System Design

In this chapter, a leader follow-up control system is designed.

Figure 6:
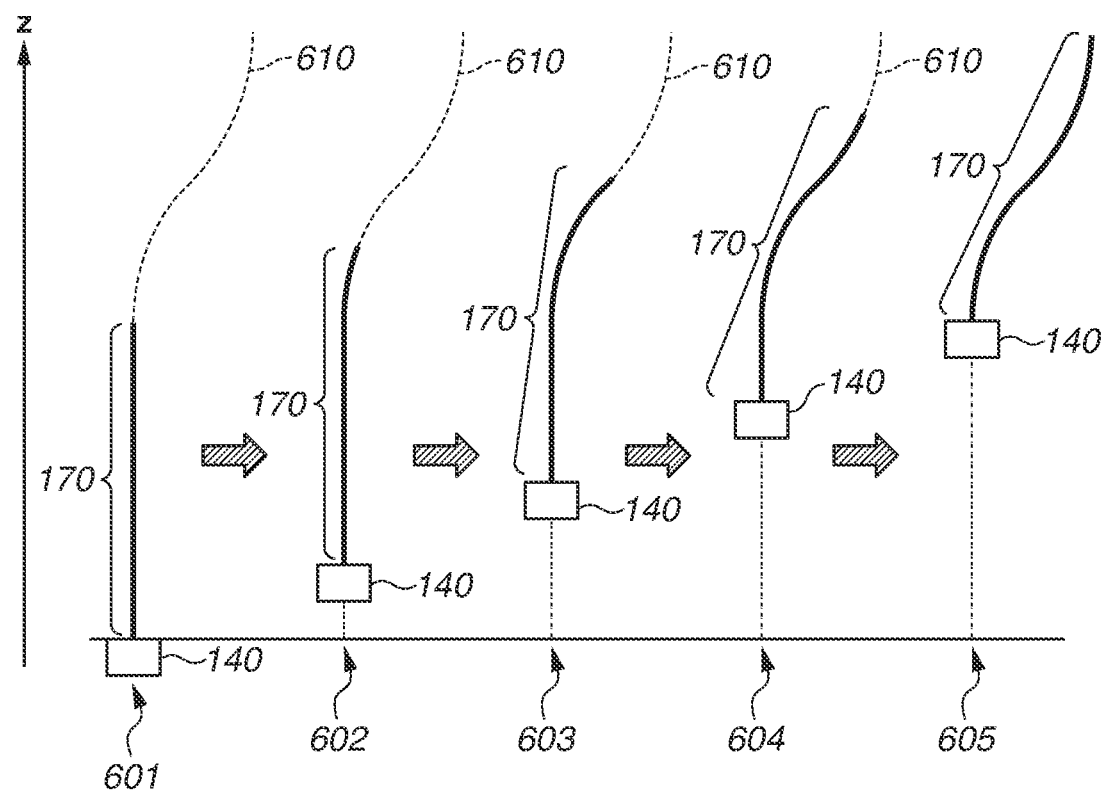
FIG. 6 is a diagram illustrating an example of leader follow-up control of the continuum robot according to the first exemplary embodiment of the present invention.

FIG. 6 is a diagram illustrating an example of leader follow-up control of the continuum robot 100 according to the first exemplary embodiment of the present invention. In FIG. 6, components similar to the components illustrated in FIG. 1A are assigned the same reference numerals. In addition, in FIG. 6, the z direction illustrated in FIG. 1A is set to a direction toward a paper surface upper side from a paper surface lower side. In FIG. 6, a dotted line indicates a target route 610 along which the continuum robot 100 including the base unit 140 and the bendable portion 170 moves forward.

Here, the leader follow-up control is a method of controlling a following bending section to pass through a route that is the same as a route (target route 610) through which a most distal bending section of the bendable portion 170 passes, as illustrated in FIG. 6. Examples of the leader follow-up control include controlling, in accordance with a profile of a first bending angle regarding a bending angle of a follow-up bending section that corresponds to a forward movement of the continuum robot, and is set in accordance with an input first target bending angle of the distal bending section, a bending angle of the follow-up bending section to reach the first target bending angle.

In FIG. 6, a time point 601 indicates an initial state in which the bendable portion 170 extending in the z direction from the top surface of the base unit 140 is not bent. After that, FIG. 6 illustrates how the base unit 140 moves in the z direction and the bendable portion 170 bends as time advances to a time point 602, a time point 603, a time point 604, and a time point 605.

By such leader follow-up control, the continuum robot 100 can move forward in such a manner as to slip through a space. In the leader follow-up control, the target route 610 needs not be always predefined. For example, a bending angle of a most distal bending section may be continuously propagated to a bending angle of a following bending section over a length of the bending section. With this method, by issuing a command only for a bending angle of a most distal bending section and a displacement (movement amount (forward movement amount)) of the base unit 140 using a joystick, for example, an operator can execute leader follow-up control of the continuum robot 100 in real time.

Figure 7A:
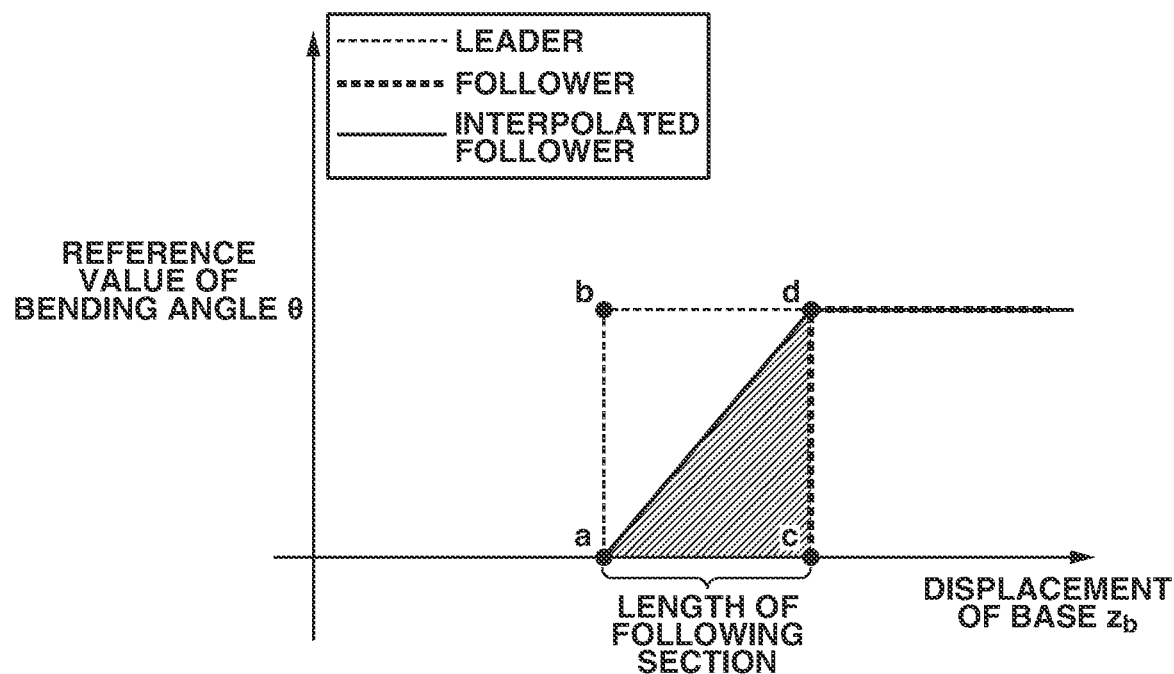
FIG. 7A is a diagram illustrating the first exemplary embodiment of the present invention, and illustrating an example of calculation processing of a target bending angle of a following bending section that is obtained after a change caused in accordance with a change in a target bending angle of a most distal bending section, which is to be executed by a following bending angle calculation unit in FIG. 3.
Figure 7B:
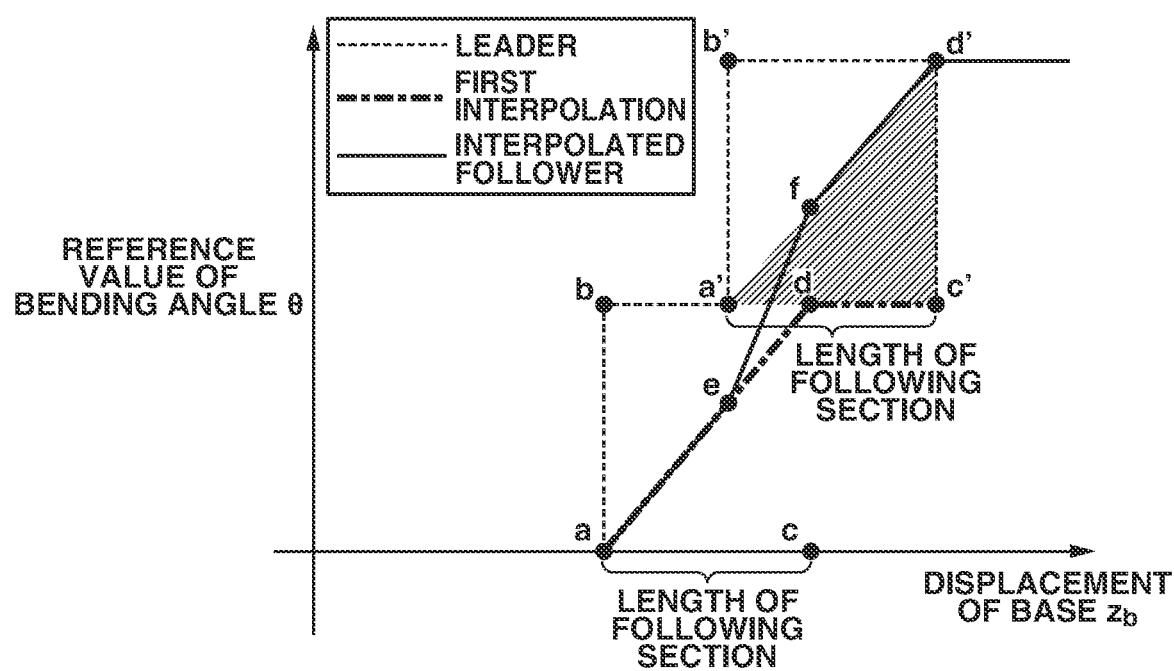
FIG. 7B is a diagram illustrating the first exemplary embodiment of the present invention, and illustrating an example of calculation processing of a target bending angle of a following bending section that is obtained after a change caused in accordance with a change in a target bending angle of a most distal bending section, which is to be executed by a following bending angle calculation unit in FIG. 3.

FIGS. 7A and 7B are diagrams illustrating the first exemplary embodiment of the present invention, and each illustrating an example of calculation processing of a target bending angle $\theta_F'$ of a following bending section that is obtained after a change caused in accordance with a change in a target bending angle $\theta_L$ of a most distal bending section, which is to be executed by the following bending angle calculation unit 210 in FIG. 3. Referring to FIG. 7, the following description will be given of an example case where the bending section 173 in FIG. 1A is applied as a most distal bending section, and the bending section 172 in FIG. 1A is applied as a following bending section.

Coordinates on a graph indicate a pair of a position of a base unit and a bending angle of a bending section. For the sake of explanatory convenience, a bending angle corresponding to coordinates a will be hereinafter sometimes referred to as an "angle a", and a position (displacement) of a base unit that corresponds to the coordinates a will be hereinafter sometimes referred to as a position a (displacement a).

In FIG. 7A, a horizontal axis indicates a displacement $z_b$ of the base unit 140, and a vertical axis indicates bending angles θ of the most distal bending section and the following bending section. In FIG. 7A, a broken line "Leader" indicates a profile of a bending angle of a most distal bending section that corresponds to the target bending angle $θ_L$ of the most distal bending section that has been input via the input device 310 by an operator. In FIG. 7A, a bold broken line "Follower" indicates a profile of a bending angle of a follow-up bending section that corresponds to the target bending angle $θ_F$ of the following bending section set before rewriting is performed by the reference table rewriting unit 212.

Specifically, if the target bending angle $θ_L$ of the most distal bending section is changed from a most distal bending angle a to a most distal bending angle b when the displacement $z_b$ of the base unit 140 is a displacement a, the target bending angle $θ_F$ of the following bending section that is indicated by the bold broken line "Follower" is automatically generated in such a manner as to be changed from a following bending angle c to a following bending angle d when the displacement $z_b$ of the base unit 140 is a displacement c. Here, the displacement c is determined in such a manner that a length between the displacement a and the displacement c becomes the length l of the following bending section.

Nevertheless, in the profile of the bending angle for the target bending angle $θ_F$ of the following bending section that is indicated by the bold broken line "Follower" in FIG. 7A, when the displacement $z_b$ of the base unit 140 exists between the displacement a and the displacement c, the target bending angle $θ_F$ of the following bending section does not change. Then, in the profile of the bending angle for the target bending angle $θ_F$ of the following bending section that is indicated by the bold broken line "Follower" in FIG. 7A, the bending angle changes from the following bending angle c to the following bending angle d at the displacement c. Thus, the continuum robot 100 exhibits a steep behavior, and the operability of the continuum robot 100 is impaired. In view of the foregoing, in the first exemplary embodiment of the present invention, as a profile of a bending angle for a changed target bending angle $θ_F'$ of the following bending section that is indicated by a solid line "Interpolated follower" in FIG. 7A, the bending angle is interpolated in such a manner that a straight line connects between the target bending angle c and the target bending angle d at a position between the displacement a and the displacement c.

Specifically, the reference table rewriting unit 212 of the following bending angle calculation unit 210 rewrites, in the following manner, a profile of a bending angle for the target bending angle $θ_F$ of the following bending section that is indicated by the bold broken line "Follower" in the reference table illustrated in FIG. 7A, to a profile of a bending angle for a changed target bending angle $θ_F'$ of the following bending section that is indicated by the solid line "Interpolated follower".

First of all, if the target bending angle $θ_L$ of the most distal bending section is changed from a first most distal bending angle a to a second most distal bending angle b in the reference table illustrated in FIG. 7A, the reference table rewriting unit 212 generates a right triangle having a length of a base that corresponds to a length from the first displacement a, which is a displacement of the base unit 140 at which the bending angle becomes the second most distal bending angle b, to the second displacement c, which is a displacement advanced from the first displacement a by the length l of the following bending section (sum of the first displacement a and the length l), and having a height corresponding to a difference between the second most distal bending angle b and the first most distal bending angle a. Specifically, the reference table rewriting unit 212 generates a right triangle shaded by diagonal hatching lines in FIG. 7A. In other words, the reference table rewriting unit 212 generates a right triangle having a length of a base that corresponds to a length from the first displacement a to the second displacement c, and having a height corresponding to a difference between the target bending angle d and the target bending angle c at the second displacement c.

Subsequently, the reference table rewriting unit 212 rewrites the reference table illustrated in FIG. 7A, by adding a value of the target bending angle from a point on a hypotenuse of the generated right triangle to the base of the right triangle (specifically, when an intersection of the hypotenuse of the right triangle and a vertical straight line orthogonal to a coordinate axis (horizontal axis) of the displacement $z_b$ of the base unit 140 is obtained at each displacement from the first displacement a to the second displacement c, a value of a length from the intersection to the base of the right triangle), to a value of the target bending angle $θ_F$ of the following bending section that is indicated by the bold broken line "Follower" in FIG. 7A (0 in the example illustrated in FIG. 7A), and setting the target bending angle of the following bending section that is obtained after the addition, as a changed target bending angle $θ_F'$ of the following bending section that is indicated by the solid line "Interpolated follower". After that, the reference table rewriting unit 212 stores the rewritten reference table into the storage unit 211.

FIG. 7A illustrates a processing method of changing the target bending angle $θ_F$ of the following bending section in response to one change operation command for the target bending angle $θ_L$ of the most distal bending section. In the present exemplary embodiment, in response to a further change operation command for the target bending angle $θ_L$ of the most distal bending section (change operation command issued a plurality of times), change processing of the target bending angle $θ_F$ of the following bending section can also be performed using a similar algorithm.

FIG. 7B illustrates an example case where a second change operation command is issued after a first change operation command is issued for the target bending angle $θ_L$ of the most distal bending section illustrated in FIG. 7A.

In FIG. 7B, similarly to FIG. 7A, a horizontal axis indicates the displacement $z_b$ of the base unit 140, and a vertical axis indicates bending angles θ of the most distal bending section and the following bending section. In FIG. 7B, a broken line "Leader" indicates a profile of a bending angle for the target bending angle $θ_L$ of the most distal bending section that has been input by an operator via the input device 310. In addition, in FIG. 7B, a target bending angle $θ_F'$ of the following bending section that is obtained after the first change and is indicated by a solid line "Interpolated follower" in FIG. 7A is indicated as a profile of a bending angle for the target bending angle $θ_F$ of the following bending section that is indicated by a bold dashed-dotted line "First Interpolation". The example illustrated in FIG. 7B indicates a case where the target bending angle $\theta_L$ of the most distal bending section is changed from the most distal bending angle b to a most distal bending angle b' when the displacement $z_b$ of the base unit 140 is smaller than the length l of the following bending section (displacement falling within the range from the displacement a to the displacement c).

If the target bending angle $\theta_L$ of the most distal bending section is changed from the first most distal bending angle b to the second most distal bending angle b' in the reference table illustrated in FIG. 7B, the reference table rewriting unit 212 generates a right triangle having a length of a base that corresponds to a length from a first displacement a' being a displacement of the base unit 140 at which the bending angle becomes the second most distal bending angle b', to the second displacement c', which is a displacement corresponding to a sum of the length l of the following bending section, and having a height corresponding to a difference between the second most distal bending angle b' and the first most distal bending angle b. Specifically, the reference table rewriting unit 212 generates a right triangle shaded by diagonal hatching lines in FIG. 7B. In other words, the reference table rewriting unit 212 generates a right triangle having a length of a base that corresponds to a length from the first displacement a' to the second displacement c', and having a height corresponding to a difference between a target bending angle d' and a target bending angle c' at the second displacement c'.

Subsequently, the reference table rewriting unit 212 rewrites the reference table illustrated in FIG. 7B, by adding a value of the target bending angle from a point on a hypotenuse of the generated right triangle to the base of the right triangle (specifically, when an intersection of the hypotenuse of the right triangle and a vertical straight line orthogonal to a coordinate axis (horizontal axis) of the displacement $z_b$ of the base unit 140 is obtained at each displacement from the first displacement a' to the second displacement c', a value of a length from the intersection to the base of the right triangle), to a value of the target bending angle $\theta_F$ of the following bending section that is indicated by the bold dashed-dotted line "First Interpolation" in FIG. 7B, and setting the target bending angle of the following bending section that is obtained after the addition, as a changed target bending angle $\theta_F'$ of the following bending section that is indicated by the solid line "Interpolated follower". After that, the reference table rewriting unit 212 stores the rewritten reference table into the storage unit 211.

As illustrated in FIG. 7B, if the second change operation command for the target bending angle $\theta_L$ of the most distal bending section is issued within the range from the displacement a to the displacement c that is smaller than the length l of the following bending section, a slope of a straight line ef becomes a sum of a slope of a straight line ad and a slope of a straight line a'd'. This is because a calculation method of the changed target bending angle $\theta_F'$ of the following bending section in the present exemplary embodiment has the following features, when change operation commands successively issued at the displacement $z_b$ of the base unit 140 smaller than the length l of the following bending section are considered to be the correction of the operation.

* In a case where a first change operation command and a second change operation command for the target bending angle $\theta_L$ of the most distal bending section are issued in the same direction, the bending shape of the following bending section is controlled in such a manner that an angular speed of the bending angle increases and the second change operation command is enhanced at the displacement from the point a' to the point d.

* In a case where a first change operation command and a second change operation command for the target bending angle $\theta_L$ of the most distal bending section are issued in the opposite directions, the bending shape of the following bending section is controlled in such a manner that an angular speed of the bending angle decreases and the first change operation command is mitigated at the displacement from the point a' to the point d.

In the above-described manner, the follow-up bending section (following bending section) is controlled to reach the point d' in accordance with a profile of a second bending angle that is different from the profile of the first bending angle.

In this manner, the profile of the second bending angle that is different from the profile of the first bending angle is set. Then, a bending angle of the follow-up bending section (following bending section) is controlled to reach the second target bending angle in accordance with the profile of the second bending angle in place of the profile of the first bending angle. Whether a bending angle has reached a target bending angle may be determined by a user using desired determination criteria.

Referring to FIGS. 7A and 7B, the above description has been given of an example case where the bending section 173 in FIG. 1A is applied as a most distal bending section and the bending section 172 in FIG. 1A is applied as a following bending section. Then, in a case where the number of bending sections of the bendable portion 170 of the continuum robot 100 is three or more (for example, in a case where the number of bending sections of the bendable portion 170 illustrated in FIG. 1A is three), the bending section 171 in FIG. 1A can be applied as the above-described following bending section by applying the bending section 172 in FIG. 1A, which is immediately preceding to the bending section 171, as the above-described most distal bending section, for example.

FIG. 8 is a flowchart illustrating an example of a processing procedure of a control method of a continuum robot that is to be executed by the control system 10 of the continuum robot according to the first exemplary embodiment of the present invention.

First of all, in step S801, the continuum robot control device 200 receives, from the input device 310, an operation input for a most distal bending section being a bending section positioned at the most distal end from the base unit 140. In step S801, the continuum robot control device 200 receives, from the input device 310, the input of the target bending angle $\theta_L$ of the most distal bending section, for example. Subsequently, in step S802, the continuum robot control device 200 calculates a drive displacement of wires (linear members) of the most distal bending section based on the input target bending angle $\theta_L$ of the most distal bending section using the kinematic model calculation unit 220, and controls the continuum robot 100 based on the calculation result. By the control, a bending shape of the bendable portion 170 of the continuum robot 100 is changed.

Subsequently, in step S803, the continuum robot control device 200 determines whether an operation input to the continuum robot 100 has ended, based on input information from the input devices 310 and 330 to 340, for example.

In a case where it is determined as a result of the determination in step S803 that an operation input to the continuum robot 100 has not ended (No in step S803), the processing proceeds to step S804. If the processing proceeds to step S804, the continuum robot control device 200 determines whether the base unit 140 of the continuum robot 100 has moved forward, based on input information from the input device 330, for example. In a case where it is determined as a result of the determination in step S804 that the base unit 140 of the continuum robot 100 has not moved forward (No in step S804), the processing returns to step S801, and the processing in step S801 and subsequent steps is performed again.

On the other hand, in a case where it is determined as a result of the determination in step S804 that the base unit 140 of the continuum robot 100 has moved forward (Yes in step S804), the processing proceeds to step S805. If the processing proceeds to step S805, the reference table rewriting unit 212 of the following bending angle calculation unit 210 generates right triangle data shaded by diagonal hatching lines, in the reference table illustrated in FIG. 7A or 7B. In a case where the reference table rewriting unit 212 generates right triangle data in the reference table illustrated in FIG. 7A, the reference table rewriting unit 212 generates a right triangle having a length (width) of a base that corresponds to the length l of the following bending section from the first displacement a to the second displacement c, and having a height corresponding to a difference between the target bending angle b corresponding to a second most distal bending angle $\theta_{L2}$, and the target bending angle a corresponding to a first most distal bending angle $\theta_{L1}$ (more specifically, a height corresponding to a difference between the target bending angle d and the target bending angle c at the second displacement c). In a case where the reference table rewriting unit 212 generates right triangle data in the reference table illustrated in FIG. 7B, the reference table rewriting unit 212 generates a right triangle having a length (width) of a base that corresponds to the length l of the following bending section from the first displacement a' to the second displacement c', and having a height corresponding to a difference between the target bending angle b' corresponding to the second most distal bending angle $\theta_{L2}$, and the target bending angle b corresponding to the first most distal bending angle $\theta_{L1}$ (more specifically, a height corresponding to a difference between the target bending angle d' and the target bending angle c' at the second displacement c').

Subsequently, in step S806, the reference table rewriting unit 212 of the following bending angle calculation unit 210 interpolates the bending angle by adding the right triangle data generated in step S805, to the target bending angle $\theta_F$ of the following bending section in the current reference table stored in the storage unit 211. A changed target bending angle $\theta_F'$ of the following bending section that is obtained by the interpolation is indicated by the solid line in the reference table illustrated in FIG. 7A or 7B.

Subsequently, in step S807, the reference table rewriting unit 212 of the following bending angle calculation unit 210 performs processing of writing data starting from the displacement c (right side of the displacement c) in FIG. 7A, or data starting from the displacement c' (right side of the displacement c') in FIG. 7B for the target bending angle $\theta_L$ of the most distal bending section. If the processing in step S807 ends, the processing returns to step S801.

In a case where it is determined as a result of the determination in step S803 that an operation input to the continuum robot 100 has ended (Yes in step S803), the processing in the flowchart illustrated in FIG. 8 ends.
3) Simulation In this chapter, simulation is performed using the leader follow-up control system described in 2) Control System Design in the preceding chapter. In the simulation, the continuum robot 100 having the number of bending sections being set to 2, having a length of a first bending section being set to 0.02 m, and a length of a second bending section being set to 0.02 m is targeted. At this time, for example, the second bending section is applied as the above-described most distal bending section and the first bending section is applied as the above-described following bending section.

Figure 9:
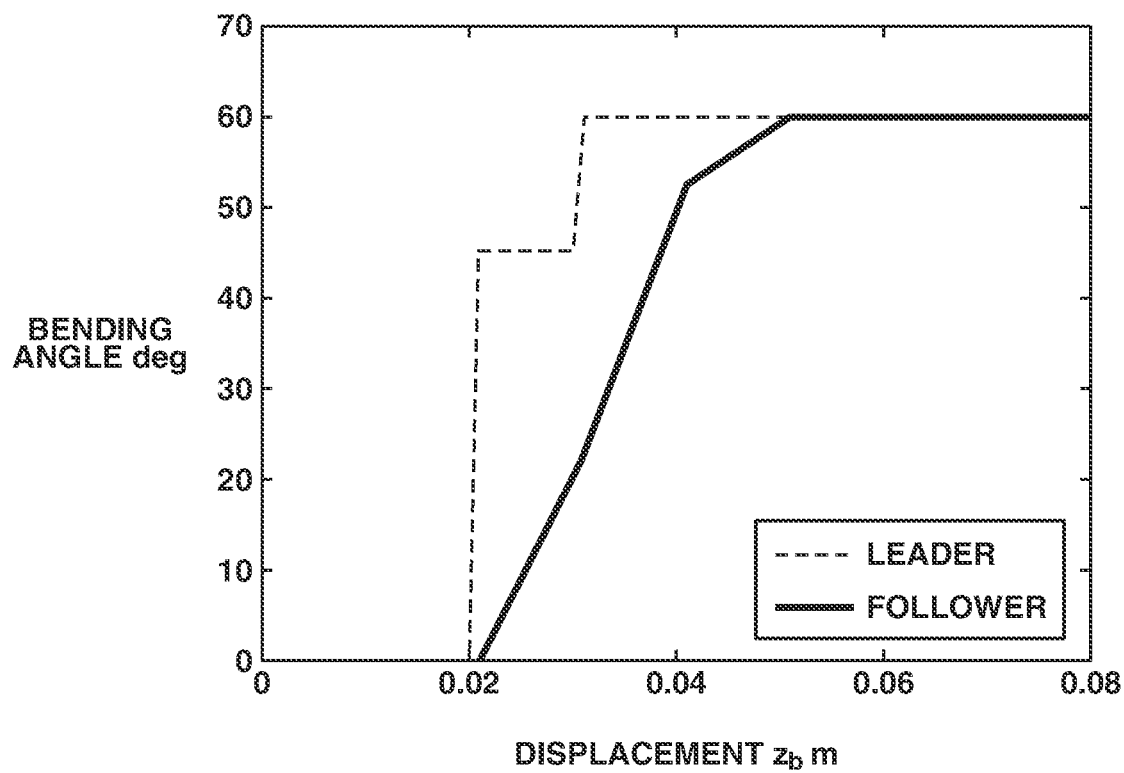
FIG. 9 is a diagram illustrating the first exemplary embodiment of the present invention, and illustrating an example of a simulation result of a target bending angle of a following bending section that is obtained in a case where a first change operation command and a second change operation command for a target bending angle of a most distal bending section are issued in the same direction.

FIG. 9 is a diagram illustrating the first exemplary embodiment of the present invention, and illustrating an example of a simulation result of a target bending angle of a following bending section that is obtained in a case where a first change operation command and a second change operation command for a target bending angle $\theta_L$ of a most distal bending section are issued in the same direction. In FIG. 9, a horizontal axis indicates the displacement $z_b$ of the base unit 140, and a vertical axis indicates bending angles θ of the most distal bending section and the following bending section. In addition, in FIG. 9, a broken line "Leader" indicates a profile of a bending angle for the target bending angle $\theta_L$ of the most distal bending section, and a solid line "Follower" indicates a profile of a bending angle for the target bending angle $\theta_F'$ of the following bending section that is obtained after a change caused in accordance with a change in the target bending angle $\theta_L$ of the most distal bending section.

In FIG. 9, a first bending change operation command of moving the continuum robot 100 forward in the z direction by 0.02 m in a direct advance state after an operation start of the continuum robot 100, and bending the most distal bending section by 45 degrees at the position is issued. After that, a second bending change operation command of moving the continuum robot 100 forward in the z direction by 0.01 m, and further bending the most distal bending section in the same direction by 15 degrees (finally 60 degrees) at the position is issued.

FIGS. 10A to 10D are diagrams illustrating the first exemplary embodiment of the present invention, and each illustrating an example of an operation state of the bendable portion 170 of the continuum robot 100 that reflects the simulation result illustrated in FIG. 9. Specifically, FIGS. 10A to 10D illustrate an operation state of the bendable portion 170 of the continuum robot 100 in chronological order, a horizontal axis indicates a displacement in the x direction, and a vertical axis indicates a displacement in the z direction. In FIGS. 10A to 10D, a solid line indicates a bending state of the bendable portion 170 of the continuum robot 100, and a broken line indicates the target route 610.

Figure 10A:
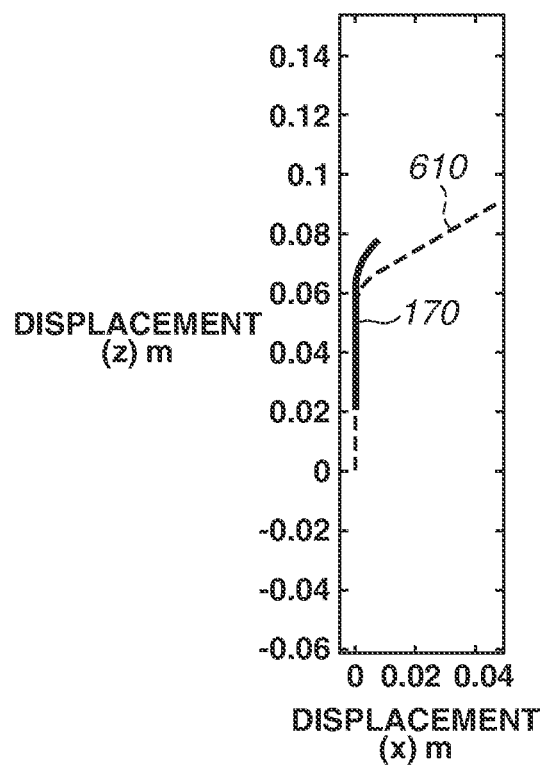
FIG. 10A is a diagram illustrating the first exemplary embodiment of the present invention, and illustrating an example of an operation state of a bendable portion of a continuum robot that reflects the simulation result illustrated in FIG. 9.

In FIG. 10A, the continuum robot 100 is moved forward in the z direction in a direct advance state up to 0.02 m, and the most distal bending section of the bendable portion 170 is bent by 45 degrees at the position. Subsequently, in FIG. 10B, to correct a deviation from the target route 610, the forward movement of the continuum robot 100 is stopped, and in FIG. 10C, the most distal bending section of the bendable portion 170 is subsequently bent up to 60 degrees. The second bending operation is performed with the displacement $Z_b$ of the base unit 140 that does not exceed the length of the bending section (length l of following bending section=0.02 m), from the first bending operation. For this reason, as illustrated in FIG. 9, in a profile of a bending angle for the target bending angle $\theta_F$ of the following bending section that is indicated by the solid line "Follower", an angular speed is large when the displacement $z_b$ of the base unit 140 is 0.03 m to 0.04 m, and the correction of the bending operation is reflected in the following bending section in a subsequent short displacement $z_b$ of the base unit 140. With this configuration, in FIG. 10D, the bendable portion 170 can be approximated to the target route 610.

Figure 11:
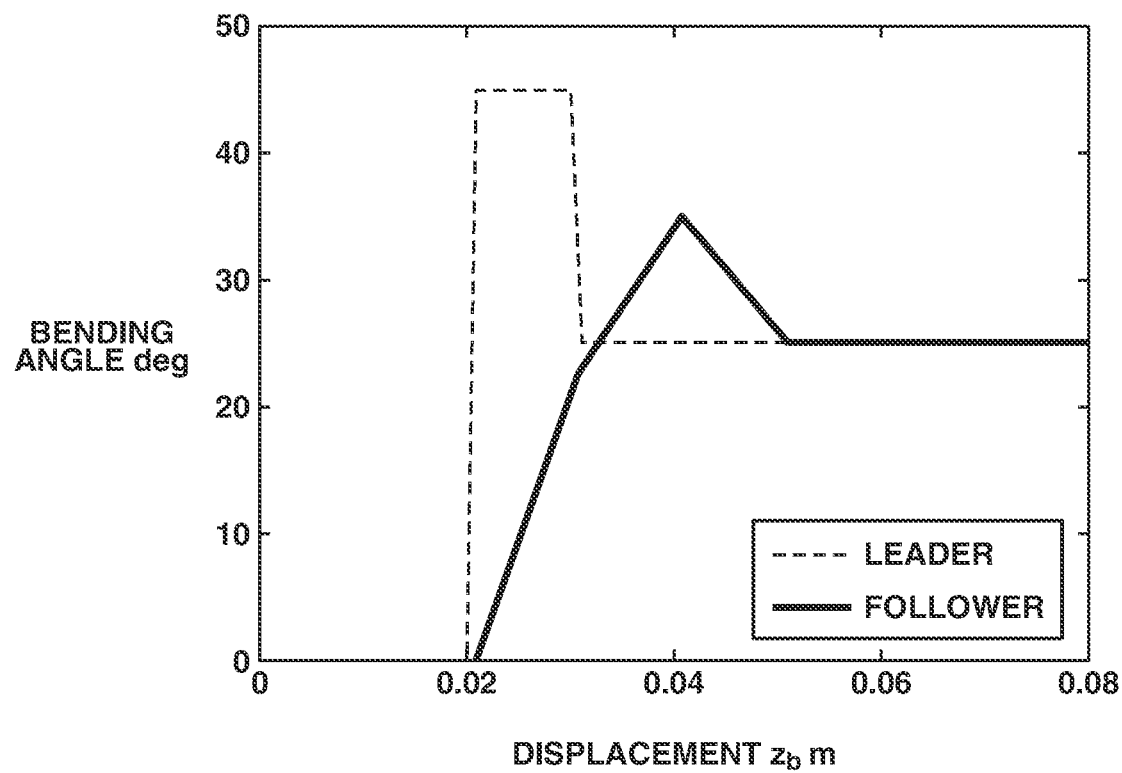
FIG. 11 is a diagram illustrating the first exemplary embodiment of the present invention, and illustrating an example of a simulation result of a target bending angle of a following bending section that is obtained in a case where a first change operation command and a second change operation command for a target bending angle of a most distal bending section are issued in opposite directions.

FIG. 11 is a diagram illustrating the first exemplary embodiment of the present invention, and illustrating an example of a simulation result of a target bending angle of a following bending section that is obtained in a case where a first change operation command and a second change operation command for a target bending angle $\theta_L$ of a most distal bending section are issued in opposite directions. In FIG. 11, the description of matters similar to the matters described with reference to FIG. 9 will be omitted.

In FIG. 11, a first bending change operation command of moving the continuum robot 100 forward in the z direction by 0.02 m in a direct advance state after an operation start of the continuum robot 100, and bending the most distal bending section by 45 degrees at the position is issued. After that, a second bending change operation command of moving the continuum robot 100 forward in the z direction by 0.01 m, and bending the most distal bending section in an opposite direction by 20 degrees (finally 25 degrees) at the position is issued.

FIGS. 12A to 12D are diagrams illustrating the first exemplary embodiment of the present invention, and each illustrating an example of an operation state of the bendable portion 170 of the continuum robot 100 that reflects the simulation result illustrated in FIG. 11. Specifically, FIGS. 12A to 12D illustrate an operation state of the bendable portion 170 of the continuum robot 100 in chronological order, a horizontal axis indicates a displacement in the x direction, and a vertical axis indicates a displacement in the z direction. In FIGS. 12A to 12D, a solid line indicates a bending state of the bendable portion 170 of the continuum robot 100, and a broken line indicates the target route 610.

Figure 12A:
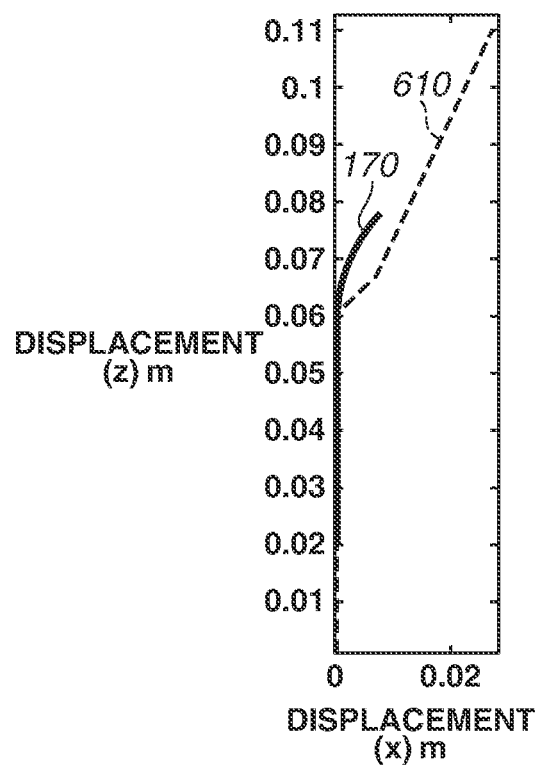
FIG. 12A is a diagram illustrating the first exemplary embodiment of the present invention, and illustrating an example of an operation state of a bendable portion of a continuum robot that reflects the simulation result illustrated in FIG. 11.

In FIG. 12A, the continuum robot 100 is moved forward in the z direction in a direct advance state up to 0.02 m, and the most distal bending section of the bendable portion 170 is bent by 45 degrees at the position. Subsequently, in FIG. 12B, to correct a deviation from the target route 610, the forward movement of the continuum robot 100 is stopped, and in FIG. 12C, the bending of the most distal bending section of the bendable portion 170 is made shallower up to 25 degrees. For this reason, as illustrated in FIG. 11, in a profile of a bending angle for the target bending angle $\theta_F$ of the following bending section that is indicated by the solid line "Follower", an angular speed is small when the displacement $Z_b$ of the base unit 140 is 0.03 m to 0.04 m, the target bending angle $\theta_F$ of the following bending section stops reaching 45 degrees, and the correction of the bending operation is reflected in the following bending section in a subsequent short displacement $Z_b$ of the base unit 140. With this configuration, in FIG. 12D, the bendable portion 170 can be approximated to the target route 610.

In the control system 10 of the continuum robot according to the first exemplary embodiment described above, as illustrated in FIG. 7 and the like, based on the target bending angle $\theta_L$ of the most distal bending section, the displacement $z_b$ of the base unit 140, and the length l of the following bending section, a target bending angle $\theta_F'$ of the following bending section that is obtained after a change caused in accordance with a change in the target bending angle $\theta_L$ of the most distal bending section is calculated.

With this configuration, even in a case where the target bending angle $\theta_L$ of the most distal bending section is changed when the displacement $z_b$ of the base unit 140 is smaller than the length of a bending section (in the present exemplary embodiment, following bending section), the operability of the continuum robot 100 can be improved. A failure that damages a target object for operating the continuum robot 100 along the target route 610, or breaks the continuum robot 100 can thereby be suppressed or avoided.

Second Exemplary Embodiment

Next, a second exemplary embodiment of the present invention will be described. In the following description of the second exemplary embodiment, the description of matters similar to the matters in the above-described first exemplary embodiment will be omitted, and matters different from the matters in the above-described first exemplary embodiment will be described.

A schematic configuration of a continuum robot according to the second exemplary embodiment is similar to the schematic configuration of the continuum robot 100 according to the first exemplary embodiment that is illustrated in FIGS. 1A and 1B. In addition, a schematic configuration of a control system of a continuum robot according to the second exemplary embodiment is similar to the schematic configuration of the control system 10 of the continuum robot according to the first exemplary embodiment that is illustrated in FIG. 3.

In the above-described first exemplary embodiment, the description has been given of a configuration in which a target bending angle of a following bending section is set in such a manner that the bendable portion 170 approximates the target route 610. In the second exemplary embodiment, the description will be given of a configuration in which a target bending angle of a following bending section is set faithfully to a target bending angle of a most distal bending section.

Figure 13:
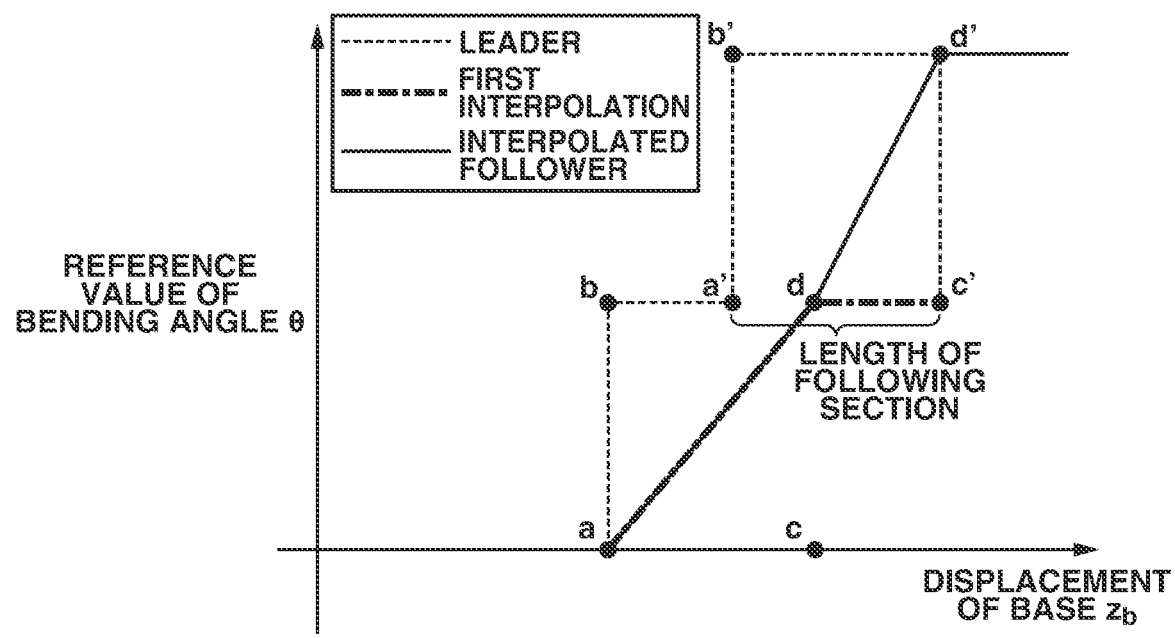
FIG. 13 is a diagram illustrating a second exemplary embodiment of the present invention, and illustrating an example of calculation processing of a target bending angle of a following bending section that is obtained after a change caused in accordance with a change in a target bending angle of a most distal bending section, which is to be executed by a following bending angle calculation unit in FIG. 3.

FIG. 13 is a diagram illustrating the second exemplary embodiment of the present invention, and illustrating an example of calculation processing of a target bending angle $\theta_F'$ of a following bending section that is obtained after a change caused in accordance with a change in a target bending angle $\theta_L$ of a most distal bending section, which is to be executed by the following bending angle calculation unit 210 in FIG. 3. Referring to FIG. 13, the following description will be given of an example case where the bending section 173 in FIG. 1A is applied as a most distal bending section, and the bending section 172 in FIG. 1A is applied as a following bending section. In addition, FIG. 13 illustrates an example case where a second change operation command is issued after a first change operation command is issued for the target bending angle $\theta_L$ of the most distal bending section illustrated in FIG. 7A.

In FIG. 13, similarly to FIG. 7B, a horizontal axis indicates a displacement $z_b$ of the base unit 140, and a vertical axis indicates target bending angles θ of the most distal bending section and the following bending section. In FIG. 13, a broken line "Leader" indicates a profile of a bending angle for the target bending angle $\theta_L$ of the most distal bending section that has been input by an operator via the input device 310. In FIG. 13, a profile of a bending angle for a target bending angle $\theta_F'$ of the following bending section that is obtained after the first change and is indicated by the solid line "Interpolated follower" in FIG. 7A is indicated as a profile of a bending angle for the target bending angle $\theta_F$ of the following bending section that is indicated by a bold dashed-dotted line "First Interpolation". The example illustrated in FIG. 13 indicates a case where the target bending angle $\theta_L$ of the most distal bending section is changed from a most distal bending angle b to a most distal bending angle b' when the displacement $z_b$ of the base unit 140 is smaller than the length l of the following bending section (displacement falling within the range from the displacement a to the displacement c).

If the target bending angle $\theta_L$ of the most distal bending section is changed from the first most distal bending angle b to the second most distal bending angle b' in the reference table illustrated in FIG. 13, the reference table rewriting unit 212 interpolates, for a displacement range (range from the first displacement d to the second displacement c') excluding a range from a displacement a of the base unit 140 at which the bending angle becomes the first most distal bending angle b, to a first displacement d being a displacement corresponding to a sum of the length l of the following bending section, from a range from a displacement a' being the displacement $z_b$ of the base unit 140 at which the bending angle becomes the second most distal bending angle b', to a second displacement c' being a displacement corresponding to a sum of the length l of the following bending section, a profile of a bending angle for the target bending angle $\theta_F$ of the following bending section that is indicated by the bold dashed-dotted line "First Interpolation" illustrated in FIG. 13, with a value of the target bending angle on a straight line connecting a value of the first most distal bending angle b at the first displacement d and a value of the second most distal bending angle b' at the second displacement c'. Then, the reference table illustrated in FIG. 13 is rewritten by setting the target bending angle of the following bending section that is obtained after the interpolation, as a profile of a bending angle for a changed target bending angle $\theta_F'$ of the following bending section that is indicated by the solid line "Interpolated follower". After that, the reference table rewriting unit 212 stores the rewritten reference table into the storage unit 211.

In this manner, in the control system of the present exemplary embodiment, all bending operations for a most distal bending section that are performed by an operator are interpolated and propagated to a following bending section.

Referring to FIG. 13, the above description has been given of an example case where the bending section 173 in FIG. 1A is applied as a most distal bending section and the bending section 172 in FIG. 1A is applied as a following bending section. Then, in a case where the number of bending sections of the bendable portion 170 of the continuum robot 100 is three or more (for example, in a case where the number of bending sections of the bendable portion 170 illustrated in FIG. 1A is three), the bending section 171 in FIG. 1A can be applied as the above-described following bending section by applying the bending section 172 in FIG. 1A, which is immediately preceding to the bending section 171, as the above-described most distal bending section, for example.

Figure 14:
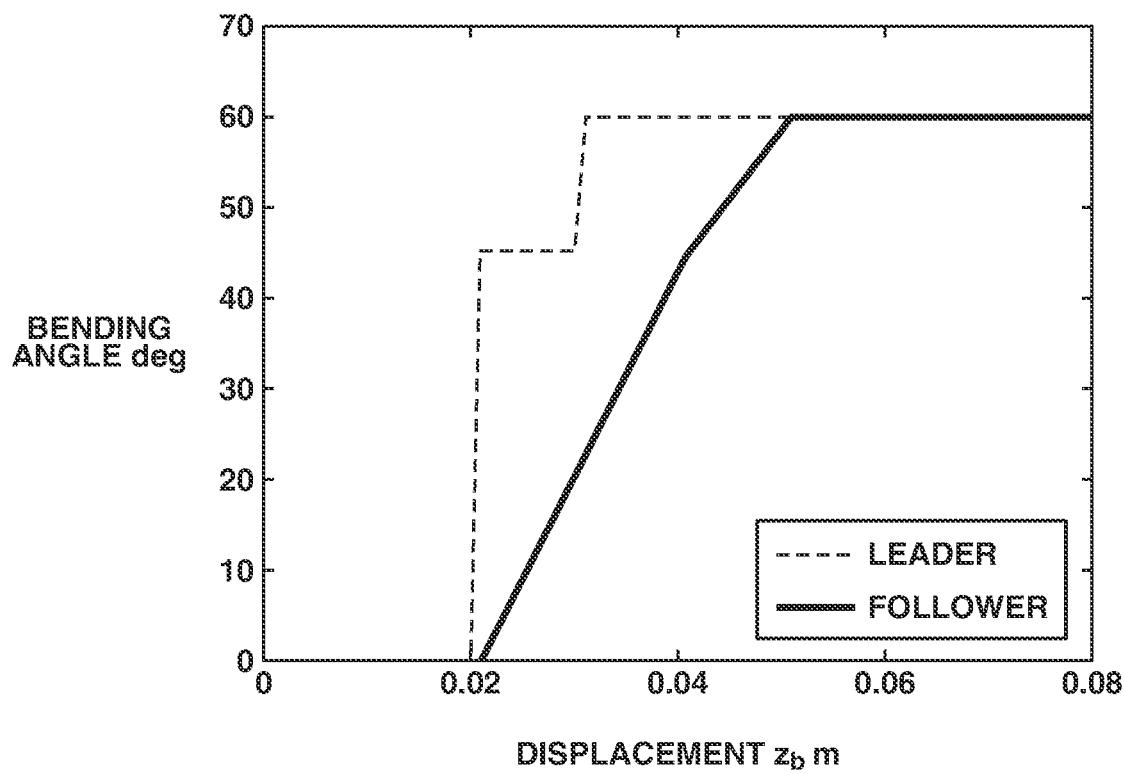
FIG. 14 is a diagram illustrating the second exemplary embodiment of the present invention, and illustrating an example of a simulation result of a target bending angle of a following bending section that is obtained in a case where a first change operation command and a second change operation command for a target bending angle of a most distal bending section are issued in the same direction.

FIG. 14 is a diagram illustrating the second exemplary embodiment of the present invention, and illustrating an example of a simulation result of a target bending angle of a following bending section that is obtained in a case where a first change operation command and a second change operation command in a profile of a bending angle for a target bending angle $\theta_L$ of a most distal bending section are issued in the same direction. In FIG. 14, a horizontal axis indicates a displacement ze of the base unit 140, and a vertical axis indicates bending angles $\theta$ of the most distal bending section and the following bending section. In FIG. 14, a broken line "Leader" indicates the target bending angle $\theta_L$ of the most distal bending section, and a solid line "Follower" indicates a profile of a bending angle for the target bending angle $\theta_F'$ of the following bending section that is obtained after a change caused in accordance with a change in the target bending angle $\theta_L$ of the most distal bending section.

FIGS. 15A to 15D are diagrams illustrating the second exemplary embodiment of the present invention, and each illustrating an example of an operation state of the bendable portion 170 of the continuum robot 100 that reflects the simulation result illustrated in FIG. 14. Specifically, FIGS. 15A to 15D illustrate an operation state of the bendable portion 170 of the continuum robot 100 in chronological order, a horizontal axis indicates a displacement in the x direction, and a vertical axis indicates a displacement in the z direction. In FIGS. 15A to 15D, a solid line indicates a bending state of the bendable portion 170 of the continuum robot 100, and a broken line indicates the target route 610.

Figure 10C:
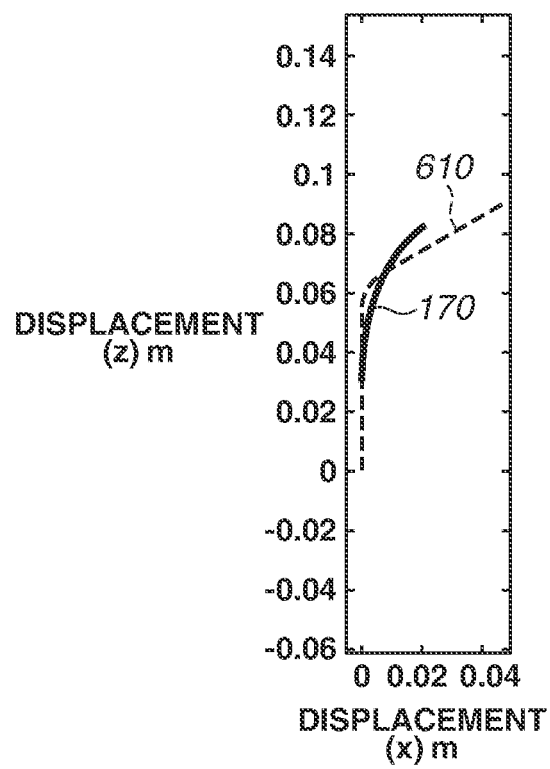
FIG. 10C is a diagram illustrating the first exemplary embodiment of the present invention, and illustrating an example of an operation state of a bendable portion of a continuum robot that reflects the simulation result illustrated in FIG. 9.
Figure 10B:
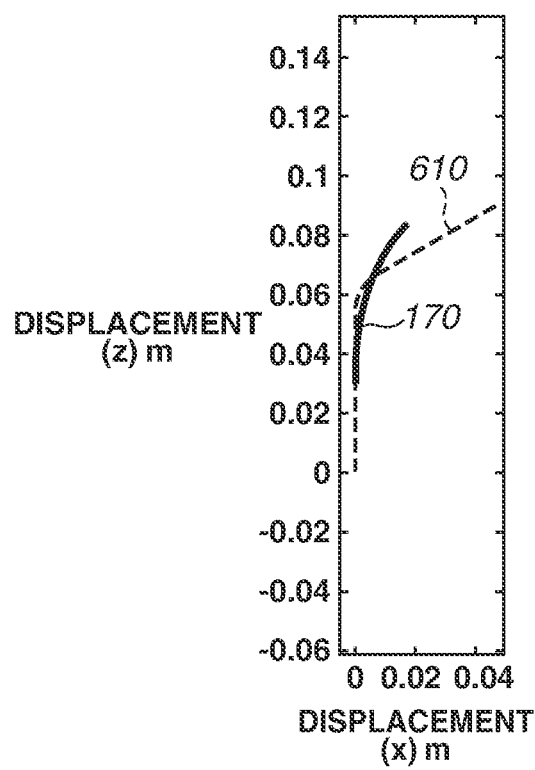
FIG. 10B is a diagram illustrating the first exemplary embodiment of the present invention, and illustrating an example of an operation state of a bendable portion of a continuum robot that reflects the simulation result illustrated in FIG. 9.
Figure 10D:
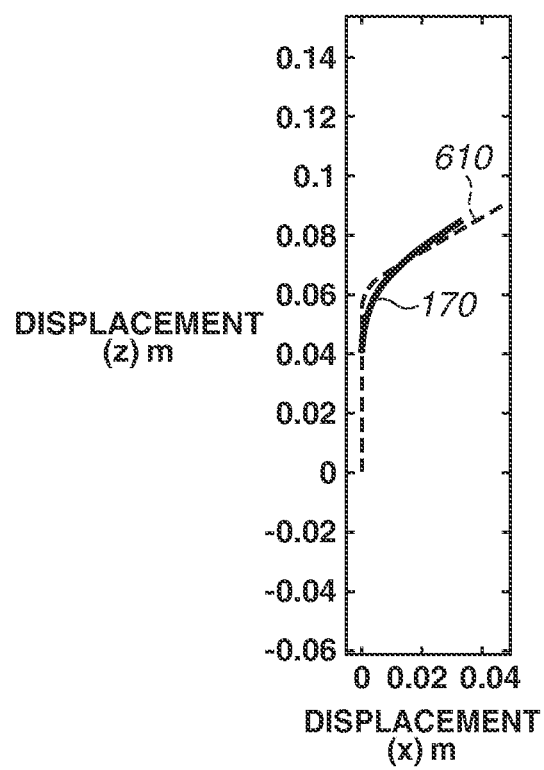
FIG. 10D is a diagram illustrating the first exemplary embodiment of the present invention, and illustrating an example of an operation state of a bendable portion of a continuum robot that reflects the simulation result illustrated in FIG. 9.
Figure 15A:
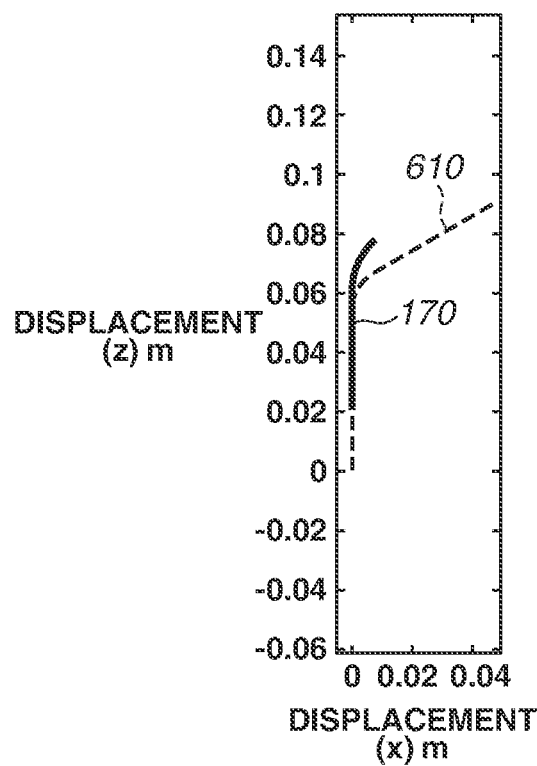
FIG. 15A is a diagram illustrating the second exemplary embodiment of the present invention, and illustrating an example of an operation state of a bendable portion of a continuum robot that reflects the simulation result illustrated in FIG. 14.
Figure 15C:
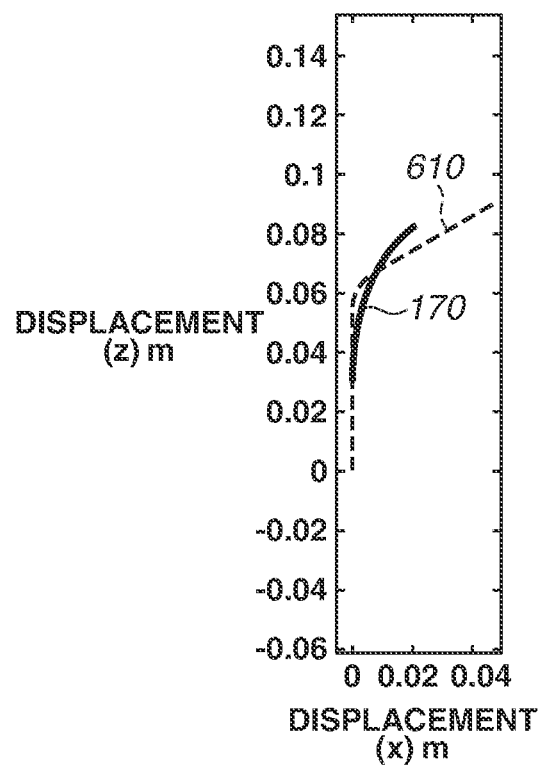
FIG. 15C is a diagram illustrating the second exemplary embodiment of the present invention, and illustrating an example of an operation state of a bendable portion of a continuum robot that reflects the simulation result illustrated in FIG. 14.
Figure 15B:
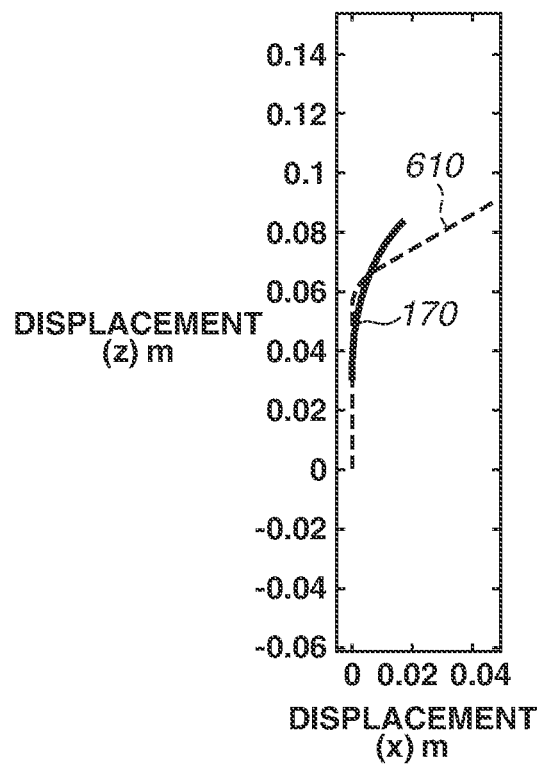
FIG. 15B is a diagram illustrating the second exemplary embodiment of the present invention, and illustrating an example of an operation state of a bendable portion of a continuum robot that reflects the simulation result illustrated in FIG. 14.
Figure 15D:
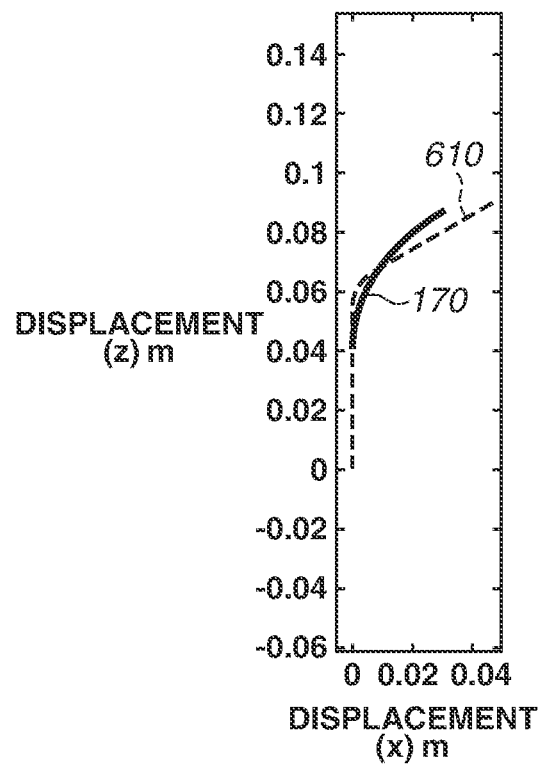
FIG. 15D is a diagram illustrating the second exemplary embodiment of the present invention, and illustrating an example of an operation state of a bendable portion of a continuum robot that reflects the simulation result illustrated in FIG. 14.

Responses in FIGS. 15A to 15C are respectively equal to responses in FIGS. 10A to 10C in the above-described first exemplary embodiment. In FIG. 15D, in the control method of the second exemplary embodiment, because bending operations performed by an operator are interpolated and propagated to a following bending section as-is, a rapid variation in an angular speed of the following bending section as described in the first exemplary embodiment does not occur. For this reason, the approximation of the bendable portion 170 to the target route 610 becomes gradual.

Figure 16:
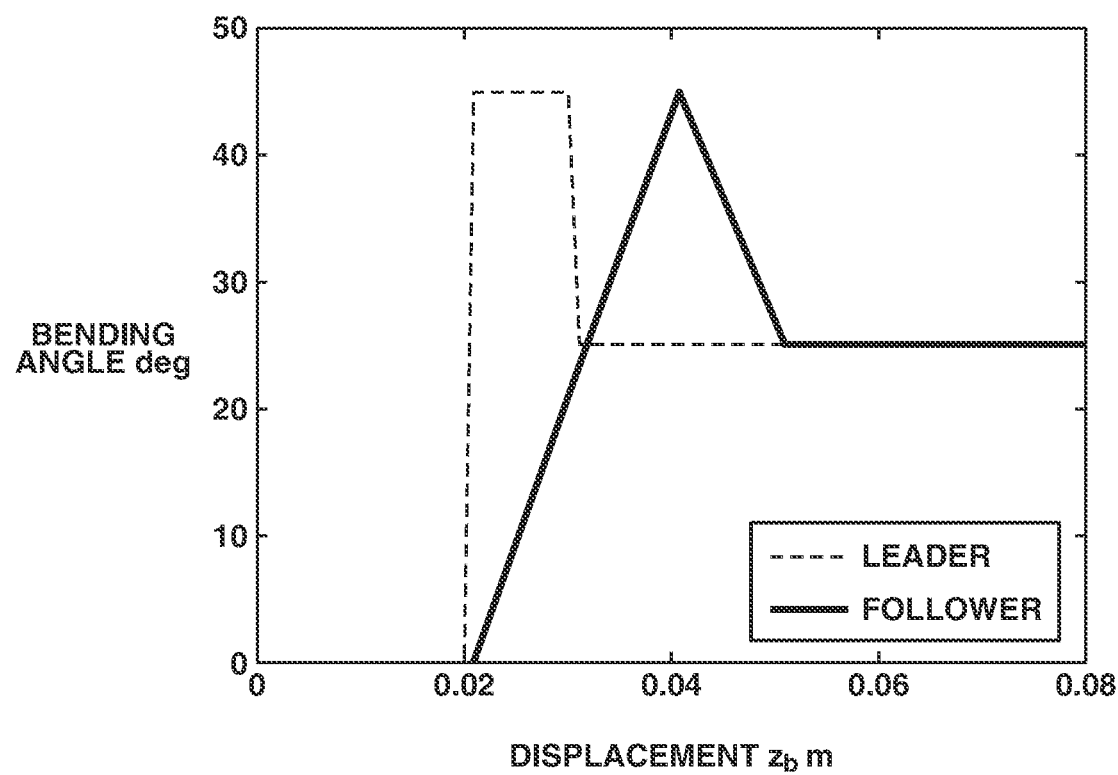
FIG. 16 is a diagram illustrating the second exemplary embodiment of the present invention, and illustrating an example of a simulation result of a target bending angle of a following bending section that is obtained in a case where a first change operation command and a second change operation command for a target bending angle of a most distal bending section are issued in opposite directions.

FIG. 16 is a diagram illustrating the second exemplary embodiment of the present invention, and illustrating an example of a simulation result of a target bending angle of a following bending section that is obtained in a case where a first change operation command and a second change operation command for a target bending angle $\theta_L$ of a most distal bending section are issued in opposite directions. In FIG. 16, the description of matters similar to the matters described with reference to FIG. 14 will be omitted.

FIGS. 17A to 17D are diagrams illustrating the second exemplary embodiment of the present invention, and each illustrating an example of an operation state of the bendable portion 170 of the continuum robot 100 that reflects the simulation result illustrated in FIG. 16. Specifically, FIGS. 17A to 17D illustrate an operation state of the bendable portion 170 of the continuum robot 100 in chronological order, a horizontal axis indicates a displacement in the x direction, and a vertical axis indicates a displacement in the z direction. In FIGS. 17A to 17D, a solid line indicates a bending state of the bendable portion 170 of the continuum robot 100, and a broken line indicates the target route 610.

Figure 12C:
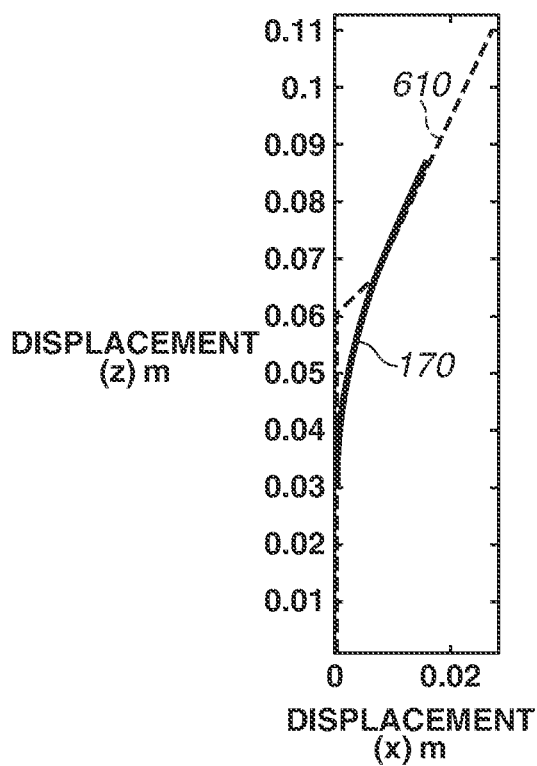
FIG. 12C is a diagram illustrating the first exemplary embodiment of the present invention, and illustrating an example of an operation state of a bendable portion of a continuum robot that reflects the simulation result illustrated in FIG. 11.
Figure 12B:
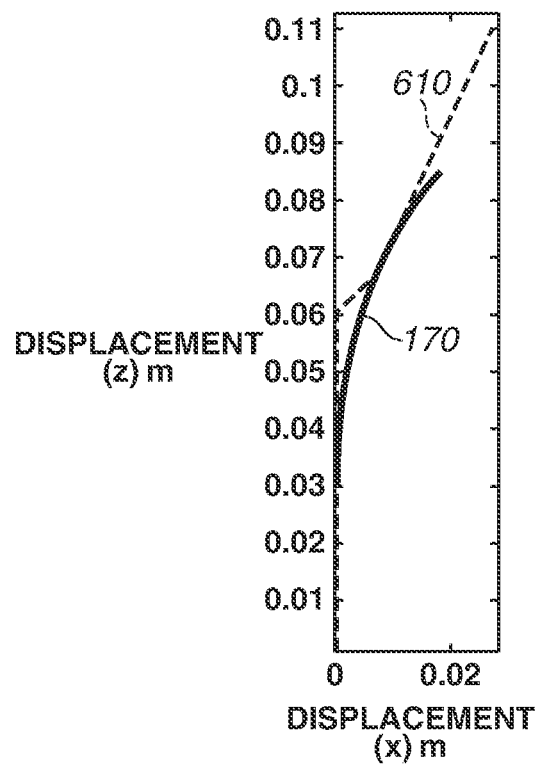
FIG. 12B is a diagram illustrating the first exemplary embodiment of the present invention, and illustrating an example of an operation state of a bendable portion of a continuum robot that reflects the simulation result illustrated in FIG. 11.
Figure 12D:
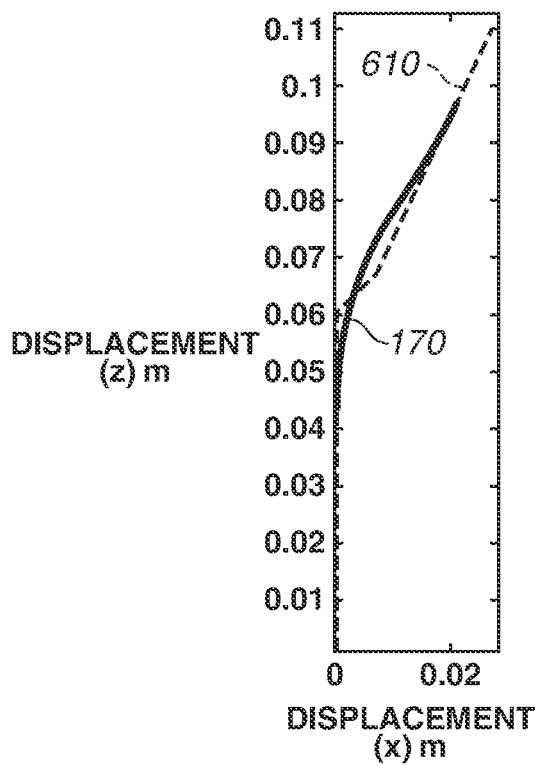
FIG. 12D is a diagram illustrating the first exemplary embodiment of the present invention, and illustrating an example of an operation state of a bendable portion of a continuum robot that reflects the simulation result illustrated in FIG. 11.
Figure 17A:
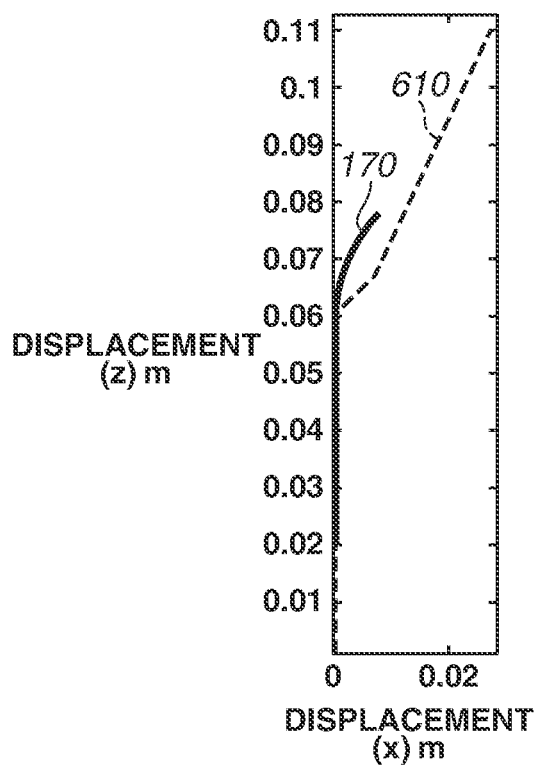
FIG. 17A is a diagram illustrating the second exemplary embodiment of the present invention, and illustrating an example of an operation state of a bendable portion of a continuum robot that reflects the simulation result illustrated in FIG. 16.
Figure 17C:
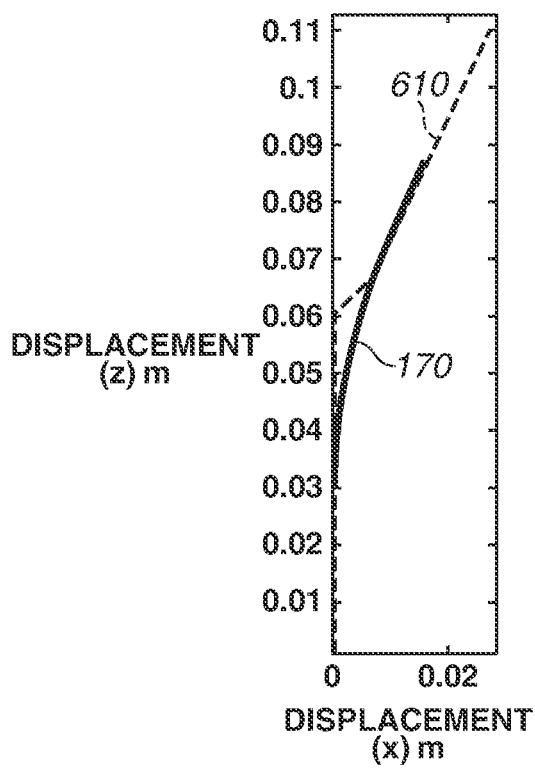
FIG. 17C is a diagram illustrating the second exemplary embodiment of the present invention, and illustrating an example of an operation state of a bendable portion of a continuum robot that reflects the simulation result illustrated in FIG. 16.
Figure 17B:
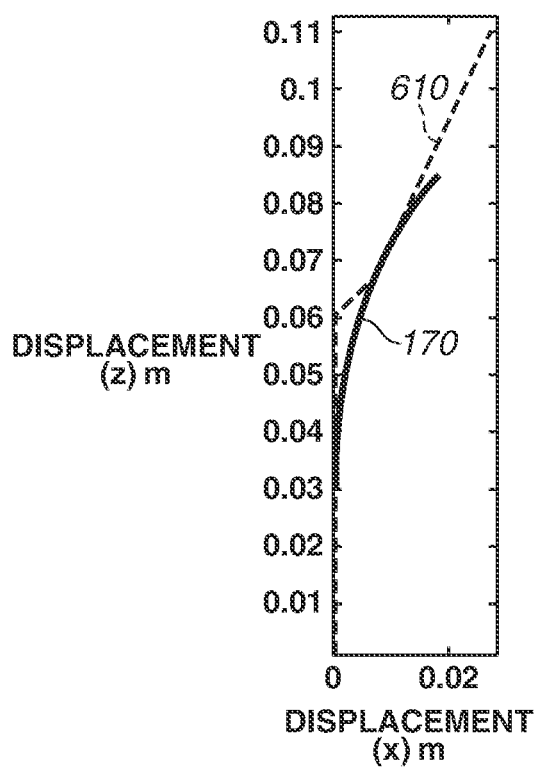
FIG. 17B is a diagram illustrating the second exemplary embodiment of the present invention, and illustrating an example of an operation state of a bendable portion of a continuum robot that reflects the simulation result illustrated in FIG. 16.
Figure 17D:
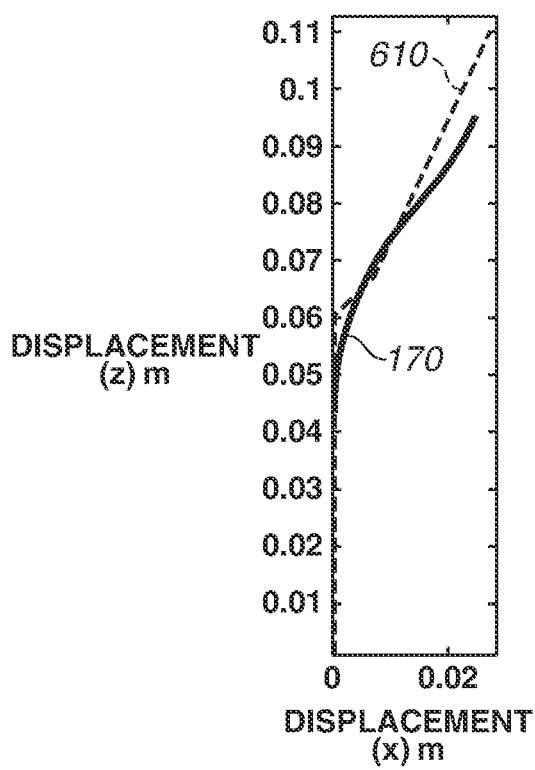
FIG. 17D is a diagram illustrating the second exemplary embodiment of the present invention, and illustrating an example of an operation state of a bendable portion of a continuum robot that reflects the simulation result illustrated in FIG. 16.

Responses in FIGS. 17A to 17C are respectively equal to responses in FIGS. 12A to 12C in the above-described first exemplary embodiment. In FIG. 17D, in the control method of the second exemplary embodiment, an amount of operation on the following bending section is not reduced before propagation as described in the first exemplary embodiment. For this reason, the approximation of the bendable portion 170 to the target route 610 becomes steep and the bendable portion 170 can overshoot, but an amount of operation on the most distal bending section is faithfully propagated.

Also in the second exemplary embodiment, similarly to the above-described first exemplary embodiment, even in a case where the target bending angle $\theta_L$ of the most distal bending section is changed when the displacement $z_b$ of the base unit 140 is smaller than the length of the following bending section, the operability of the continuum robot 100 can be improved. A failure that damages a target object for operating the continuum robot 100 along the target route 610, or breaks the continuum robot 100 can thereby be avoided.

Third Exemplary Embodiment

Next, a third exemplary embodiment of the present invention will be described. In the following description of the third exemplary embodiment, the description of matters similar to the matters in the above-described first and second exemplary embodiments will be omitted, and matters different from the matters in the above-described first and second exemplary embodiments will be described.

A schematic configuration of a continuum robot according to the third exemplary embodiment is similar to the schematic configuration of the continuum robot 100 according to the first exemplary embodiment that is illustrated in FIGS. 1A and 1B. In addition, a schematic configuration of a control system of a continuum robot according to the third exemplary embodiment is similar to the schematic configuration of the control system 10 of the continuum robot according to the first exemplary embodiment that is illustrated in FIG. 3.

In the above-described second exemplary embodiment, the description has been given of a configuration in which a target bending angle of a following bending section is set faithfully to a target bending angle of a most distal bending section. In the third exemplary embodiment, the description will be given of a configuration in which a bending operation is propagated to a following bending section while cancelling a bending operation on a most distal bending section with the displacement $z_b$ of the base unit 140 that does not exceed the length l of the bending section.

Figure 18:
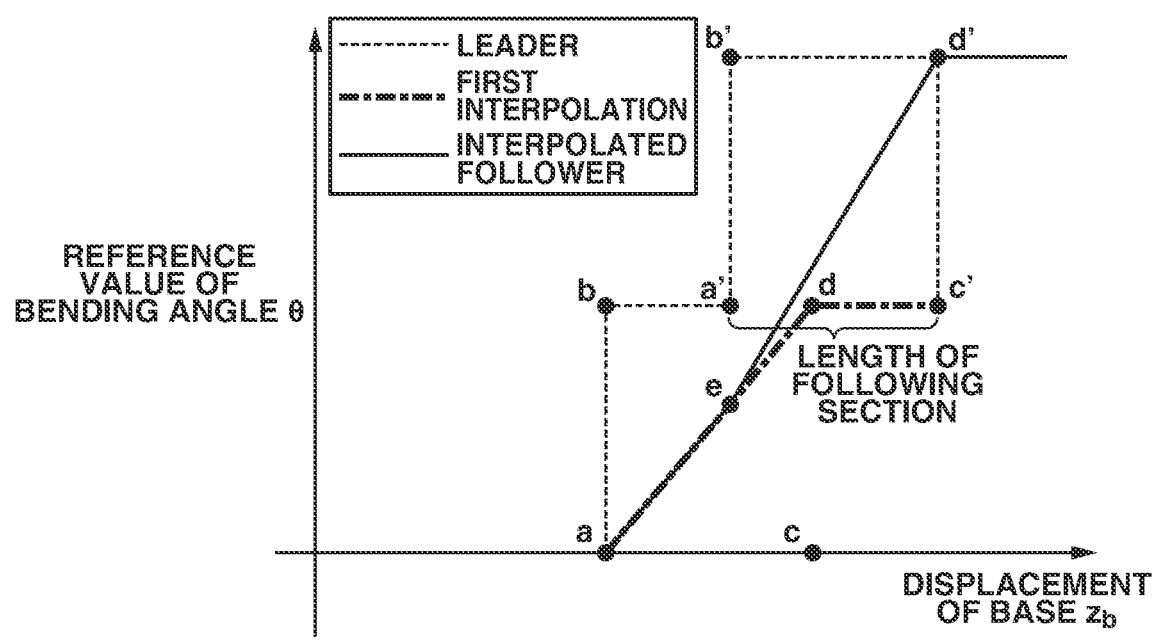
FIG. 18 is a diagram illustrating a third exemplary embodiment of the present invention, and illustrating an example of calculation processing of a target bending angle of a following bending section that is obtained after a change caused in accordance with a change in a target bending angle of a most distal bending section, which is to be executed by a following bending angle calculation unit in FIG. 3.

FIG. 18 is a diagram illustrating the third exemplary embodiment of the present invention, and illustrating an example of calculation processing of a target bending angle $\theta_F'$ of a following bending section that is obtained after a change caused in accordance with a change in a target bending angle $\theta_L$ of a most distal bending section, which is to be executed by the following bending angle calculation unit 210 in FIG. 3. Referring to FIG. 18, the following description will be given of an example case where the bending section 173 in FIG. 1A is applied as a most distal bending section, and the bending section 172 in FIG. 1A is applied as a following bending section. In addition, FIG. 18 illustrates an example case where a second change operation command is issued after a first change operation command is issued for the target bending angle $\theta_L$ of the most distal bending section illustrated in FIG. 7A.

In FIG. 18, similarly to FIG. 7B, a horizontal axis indicates the displacement $z_b$ of the base unit 140, and a vertical axis indicates bending angles θ of the most distal bending section and the following bending section. In FIG. 18, a broken line "Leader" indicates a profile of a bending angle for the target bending angle $\theta_L$ of the most distal bending section that has been input by an operator via the input device 310. In addition, in FIG. 18, a profile of a bending angle for a target bending angle $\theta_F'$ of the following bending section that is obtained after the first change and is indicated by the solid line "Interpolated follower" in FIG. 7A is indicated as a profile of a bending angle for the target bending angle $\theta_F$ of the following bending section that is indicated by a bold dashed-dotted line "First Interpolation". The example illustrated in FIG. 18 indicates a case where the target bending angle $\theta_L$ of the most distal bending section is changed from a most distal bending angle b to a most distal bending angle b' when the displacement $z_b$ of the base unit 140 is smaller than the length l of the following bending section (displacement falling within the range from the displacement a to the displacement c).

If the target bending angle $\theta_L$ of the most distal bending section is changed from the first most distal bending angle b to the second most distal bending angle b' in the reference table illustrated in FIG. 18, the reference table rewriting unit 212 interpolates, for a displacement range from a first displacement a' being the displacement ze of the base unit 140 at which the bending angle becomes the second most distal bending angle b', to a second displacement c' being a displacement corresponding to a sum of the length l of the following bending section, the target bending angle $\theta_F$ of the following bending section that is indicated by the bold dashed-dotted line "First Interpolation" illustrated in FIG. 18, with a value of the target bending angle on a straight line connecting a value e of the target bending angle $\theta_F$ of the following bending section at the first displacement a' and a value of the second most distal bending angle b' at the second displacement c'. Then, the reference table illustrated in FIG. 18 is rewritten by setting the target bending angle of the following bending section that is obtained after the interpolation, as a profile of a bending angle for a changed target bending angle $\theta_F'$ of the following bending section that is indicated by the solid line "Interpolated follower".

As illustrated in FIG. 18, in the third exemplary embodiment, the point d for propagating a first change operation command for the target bending angle $\theta_L$ of the most distal bending section to the following bending section is cancelled. With this configuration, when bending operations are consecutively performed with the displacement $z_b$ of the base unit 140 that does not exceed the length l of the bending section, a displacement between a bending angle of the following bending section that is set at the time of the final bending operation and a target bending angle formed by the final bending operation is linearly interpolated, and the bending angle obtained by the interpolation is propagated to the following bending section.

Referring to FIG. 18, the above description has been given of an example case where the bending section 173 in FIG. 1A is applied as a most distal bending section and the bending section 172 in FIG. 1A is applied as a following bending section. Then, in a case where the number of bending sections of the bendable portion 170 of the continuum robot 100 is three or more (for example, in a case where the number of bending sections of the bendable portion 170 illustrated in FIG. 1A is three), the bending section 171 in FIG. 1A can be applied as the above-described following bending section by applying the bending section 172 in FIG. 1A, which is immediately preceding to the bending section 171, as the above-described most distal bending section, for example.

Figure 19:
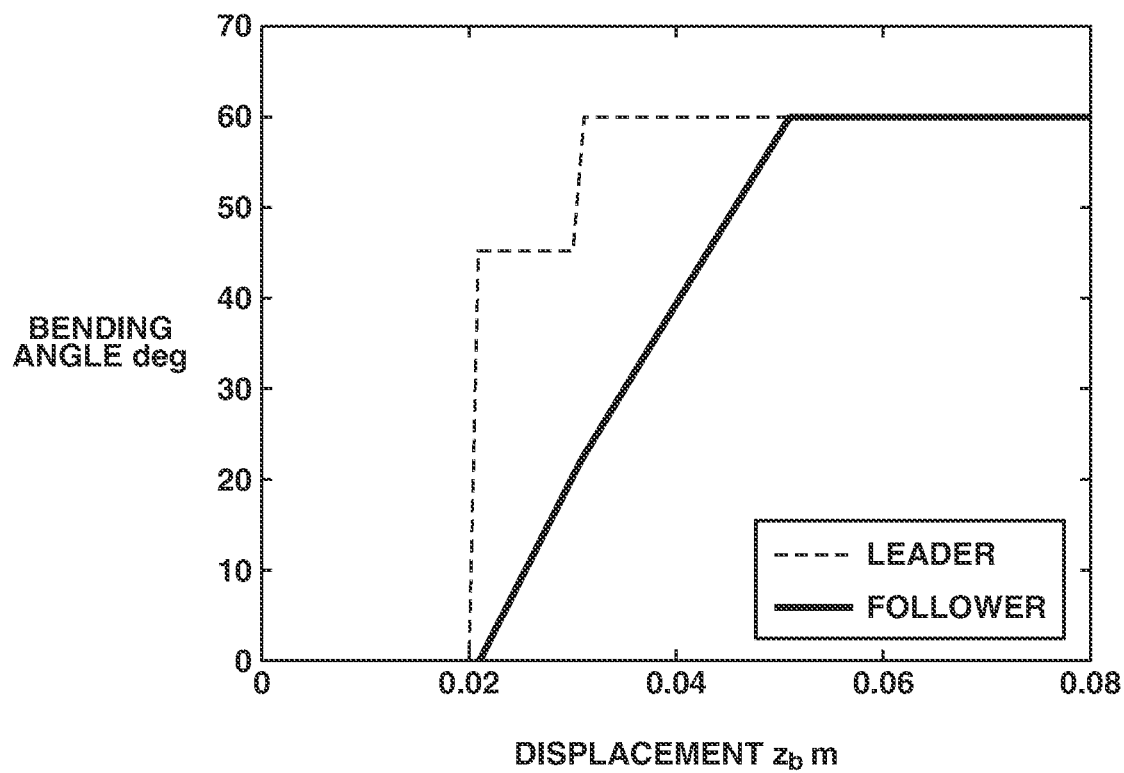
FIG. 19 is a diagram illustrating the third exemplary embodiment of the present invention, and illustrating an example of a simulation result of a target bending angle of a following bending section that is obtained in a case where a first change operation command and a second change operation command for a target bending angle of a most distal bending section are issued in the same direction.

FIG. 19 is a diagram illustrating the third exemplary embodiment of the present invention, and illustrating an example of a simulation result of a target bending angle of a following bending section that is obtained in a case where a first change operation command and a second change operation command for a target bending angle $\theta_L$ of a most distal bending section are issued in the same direction. In FIG. 19, a horizontal axis indicates a displacement $z_b$ of the base unit 140, and a vertical axis indicates bending angles θ of the most distal bending section and the following bending section. In FIG. 19, a broken line "Leader" indicates a profile of a bending angle for the target bending angle $\theta_L$ of the most distal bending section, and a solid line "Follower" indicates a profile of a bending angle for a target bending angle $\theta_F'$ of the following bending section that is obtained after a change caused in accordance with a change in a profile of a bending angle for the target bending angle $\theta_L$ of the most distal bending section.

FIGS. 20A to 20D are diagrams illustrating the third exemplary embodiment of the present invention, and each illustrating an example of an operation state of the bendable portion 170 of the continuum robot 100 that reflects the simulation result illustrated in FIG. 19. Specifically, FIGS. 20A to 20D illustrate an operation state of the bendable portion 170 of the continuum robot 100 in chronological order, a horizontal axis indicates a displacement in the x direction, and a vertical axis indicates a displacement in the z direction. In FIGS. 20A to 20D, a solid line indicates a bending state of the bendable portion 170 of the continuum robot 100, and a broken line indicates the target route 610.

Figure 20A:
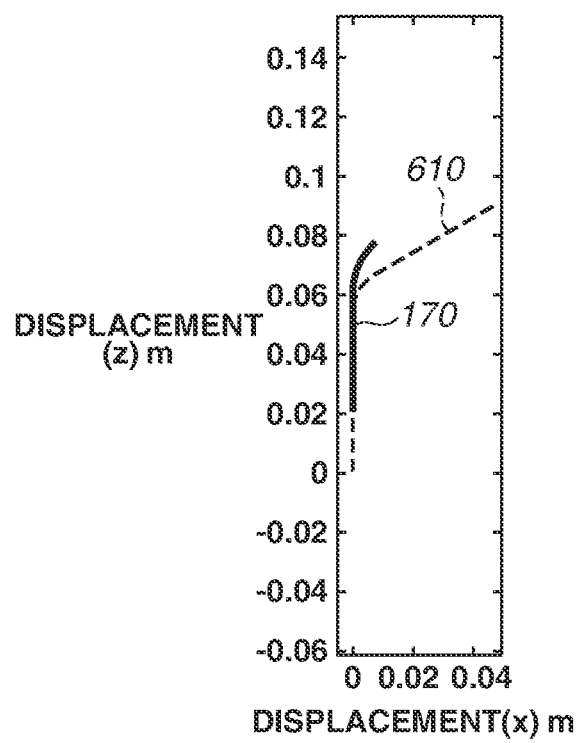
FIG. 20A is a diagram illustrating the third exemplary embodiment of the present invention, and illustrating an example of an operation state of a bendable portion of a continuum robot that reflects the simulation result illustrated in FIG. 19.
Figure 20B:
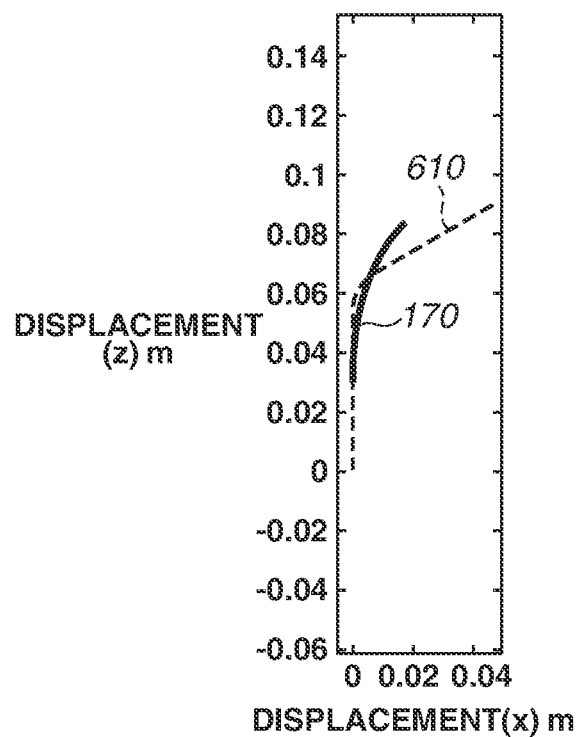
FIG. 20B is a diagram illustrating the third exemplary embodiment of the present invention, and illustrating an example of an operation state of a bendable portion of a continuum robot that reflects the simulation result illustrated in FIG. 19.
Figure 20C:
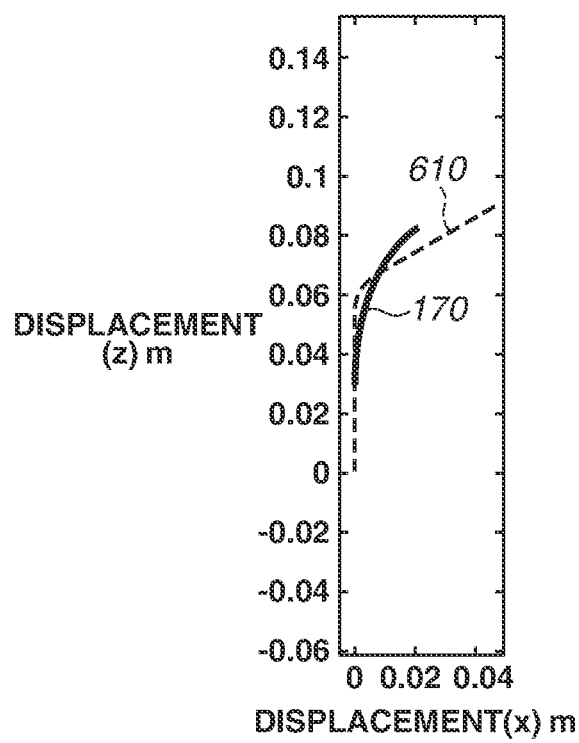
FIG. 20C is a diagram illustrating the third exemplary embodiment of the present invention, and illustrating an example of an operation state of a bendable portion of a continuum robot that reflects the simulation result illustrated in FIG. 19.
Figure 20D:
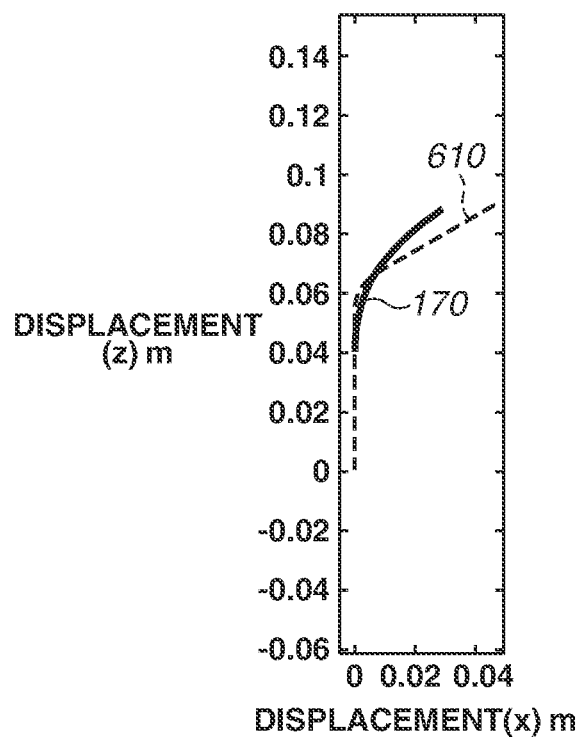
FIG. 20D is a diagram illustrating the third exemplary embodiment of the present invention, and illustrating an example of an operation state of a bendable portion of a continuum robot that reflects the simulation result illustrated in FIG. 19.

Responses in FIGS. 20A to 20C are respectively equal to responses in FIGS. 10A to 10C in the above-described first exemplary embodiment. In FIG. 20D, in the control method of the third exemplary embodiment, because a target bending angle is calculated by linearly interpolating a displacement between a bending angle of the following bending section that is set at the time of the final bending operation and an angle of the final bending operation on the distal bending section, a variation in an angular speed of the following bending section as described in the first exemplary embodiment does not occur. For this reason, the approximation of the bendable portion 170 to the target route 610 becomes gradual.

Figure 21:
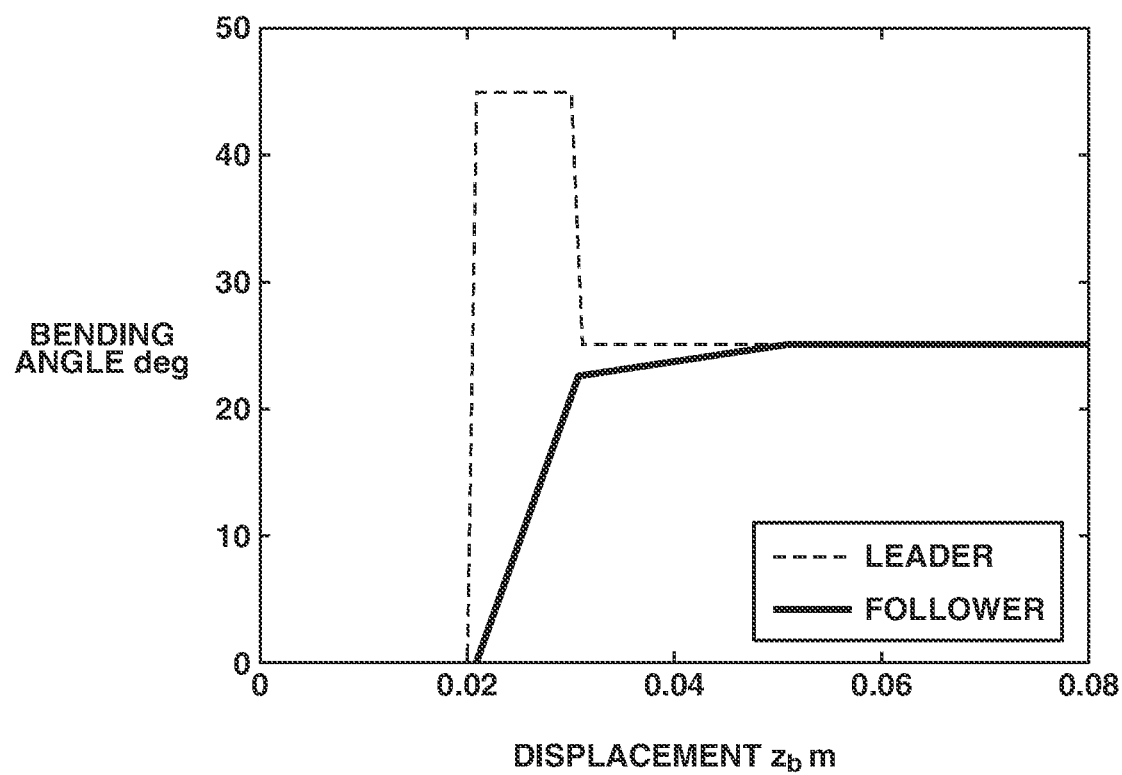
FIG. 21 is a diagram illustrating the second exemplary embodiment of the present invention, and illustrating an example of a simulation result of a target bending angle of a following bending section that is obtained in a case where a first change operation command and a second change operation command for a target bending angle of a most distal bending section are issued in opposite directions.

FIG. 21 is a diagram illustrating the third exemplary embodiment of the present invention, and illustrating an example of a simulation result of a target bending angle of a following bending section that is obtained in a case where a first change operation command and a second change operation command for a target bending angle $\theta_L$ of a most distal bending section are issued in opposite directions. In FIG. 21, the description of matters similar to the matters described with reference to FIG. 19 will be omitted.

FIGS. 22A to 22D are diagrams illustrating the third exemplary embodiment of the present invention, and each illustrating an example of an operation state of the bendable portion 170 of the continuum robot 100 that reflects the simulation result illustrated in FIG. 21. Specifically, FIGS. 22A to 22D illustrate an operation state of the bendable portion 170 of the continuum robot 100 in chronological order, a horizontal axis indicates a displacement in the x direction, and a vertical axis indicates a displacement in the z direction. In FIGS. 22A to 22D, a solid line indicates a bending state of the bendable portion 170 of the continuum robot 100, and a broken line indicates the target route 610.

Figure 22A:
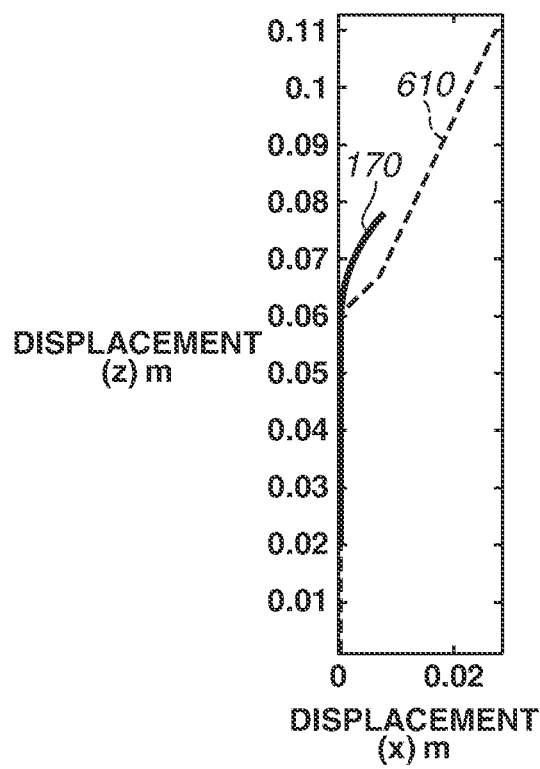
FIG. 22A is a diagram illustrating the third exemplary embodiment of the present invention, and illustrating an example of an operation state of a bendable portion of a continuum robot that reflects the simulation result illustrated in FIG. 21.
Figure 22C:
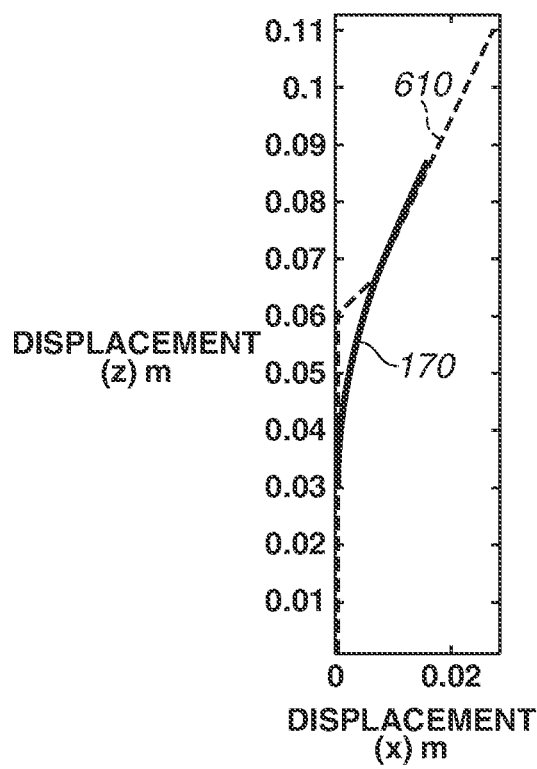
FIG. 22C is a diagram illustrating the third exemplary embodiment of the present invention, and illustrating an example of an operation state of a bendable portion of a continuum robot that reflects the simulation result illustrated in FIG. 21.
Figure 22B:
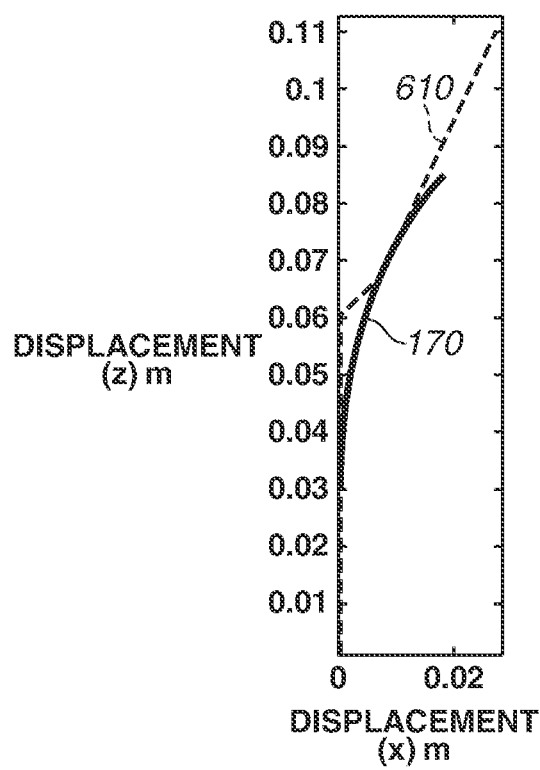
FIG. 22B is a diagram illustrating the third exemplary embodiment of the present invention, and illustrating an example of an operation state of a bendable portion of a continuum robot that reflects the simulation result illustrated in FIG. 21.
Figure 22D:
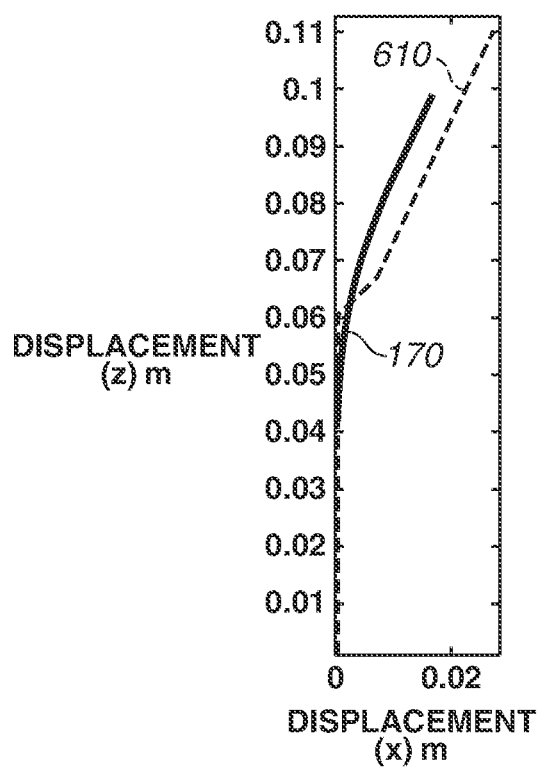
FIG. 22D is a diagram illustrating the third exemplary embodiment of the present invention, and illustrating an example of an operation state of a bendable portion of a continuum robot that reflects the simulation result illustrated in FIG. 21.

Responses in FIGS. 22A to 22C are respectively equal to responses in FIGS. 12A to 12C in the above-described first exemplary embodiment. In FIG. 22D, in the control method of the third exemplary embodiment, a correction bending operation with the displacement $z_b$ of the base unit 140 that does not exceed the length l of the bending section is not propagated. For this reason, a follow-up property of the bendable portion 170 to the target route 610 becomes gradual, but the bendable portion 170 does not overshoot the target route 610 due to the bending of the following bending section as described in the second exemplary embodiment.

Also in the third exemplary embodiment, similarly to the above-described first exemplary embodiment, even in a case where the target bending angle $\theta_L$ of the most distal bending section is changed when the displacement ze of the base unit 140 is smaller than the length of the following bending section, the operability of the continuum robot 100 can be improved. A failure that damages a target object for operating the continuum robot 100 along the target route 610, or breaks the continuum robot 100 can thereby be avoided.

Fourth Exemplary Embodiment

Next, a fourth exemplary embodiment of the present invention will be described. In the following description of the fourth exemplary embodiment, the description of matters similar to the matters in the above-described first to third exemplary embodiments will be omitted, and matters different from the matters in the above-described first to third exemplary embodiments will be described.

In the above-described first to third exemplary embodiments, a leader follow-up control method of the continuum robot 100 on the xz-plane has been described. In the fourth exemplary embodiment, leader follow-up control is performed in the xyz three-dimensional space illustrated in FIGS. 1A and 1B.

To obtain a drive displacement caused by an actuator for controlling a bending angle and a traverse angle of the continuum robot 100, a kinematic model is derived.

The definition of symbols to be used in the present exemplary embodiment is given below.

$l_d$: a length of a central axis of a bending section $\theta_n$: a bending angle of a distal bending section $\zeta_n$: a traverse angle of a distal bending section $\rho_n$: a curvature radius of a bending section $\zeta_{refn}$: a target traverse angle at the distal end of an n-th bending section In this example, a kinematic model of the continuum robot 100 is derived based on the following presumption.

1. In each bending section, a wire deforms at a fixed curvature.
2. The torsional deformation of wires is not considered.
3. A wire does not deform in a longitudinal direction.
4. The friction between wire guides and wires is not considered.

First of all, a relationship between drive displacements $l_{p1a}$, $l_{p1b}$, and $l_{p1c}$ of an a wire, a b wire, and a c wire of a first bending section (corresponding to the bending section 171 in FIGS. 1A and 1B), a bending angle $\theta_1$ at the distal end thereof, and a traverse angle $\zeta_1$ is represented by the following formula (10).

[Math. 6]

$$l_{p1a} = \frac{r_s}{\sqrt{3}} \cos\zeta_1 \theta_1 \quad (10)$$

$$l_{p1b} = \frac{r_s}{\sqrt{3}} \cos\left(\frac{\pi}{6} + \zeta_1\right)\theta_1$$

$$l_{p1c} = \frac{r_s}{\sqrt{3}} \cos\left(\frac{\pi}{6} + \zeta_1\right)\theta_1$$

Next, a relationship between drive displacements $l_{pna}$, $l_{pnb}$, and $l_{pnc}$ of the a wire, the b wire, and the c wire of the continuum robot 100 including a plurality of bending sections, a bending angle $\theta_n$ at the distal end thereof, and a traverse angle $\zeta_n$ is obtained. When the number of bending sections is denoted by "e", a phase angle of a wire driving an n-th bending section is represented by the following formula (11).

[Math. 7]

$$\xi_n = \frac{120}{e}n \quad (11)$$

Consequently, the wire drive displacement $l_{pna}$, $l_{pnb}$, and $l_{pnc}$ of the n-th bending section are represented by the following formula (12).

[Math. 8]

$$l_{pna} = \frac{r_s}{\sqrt{3}}\cos(\zeta_n - \xi_n)\theta_n \quad (12)$$
$$l_{pnb} = \frac{r_s}{\sqrt{3}}\cos\left(\frac{\pi}{6} + \zeta_n - \xi_n\right)\theta_n$$
$$l_{pnc} = \frac{r_s}{\sqrt{3}}\cos\left(\frac{\pi}{6} + \zeta_n - \xi_n\right)\theta_n$$

When a target bending angle $\theta_{refe}$ and a target traverse angle $\zeta_{refe}$ are given by an operator via the input device 310 for an e-th bending section at the most distal end, by obtaining the wire drive displacements using Formula (12), an angle at the most distal end can be controlled. Then, the leader follow-up control is only required to propagate a target bending angle similarly to planar driving in the first to third exemplary embodiments, and calculate a target angle using a similar algorithm by treating a bending angle in the first to third exemplary embodiments as a traverse angle. Then, by obtaining the wire drive displacements using Formula (12) for each following bending section, leader follow-up control can be performed in the three-dimensional space.

Other Exemplary Embodiment

As other exemplary embodiments, the storage unit 211 may store the reference tables 2111 to be used in the leader follow-up control method according to the above-described first to third exemplary embodiments, and the reference table rewriting unit 212 may execute processing after selecting the reference table 2111 to be used in a corresponding exemplary embodiment, based on input information from the information input unit 213.

Exemplary embodiments of the present invention can also be implemented by processing of supplying a program implementing one or more functions of the above-described exemplary embodiments, to a system or an apparatus via a network or a storage medium, and one or more processors in a computer of the system or the apparatus reading out the program and executing the program. In addition, Exemplary embodiments of the present invention can also be implemented by a circuit implementing the one or more functions (e.g., application specific integrated circuit (ASIC)).

The program and a computer-readable storage medium storing the program are included in the present invention.

Each of the above-described exemplary embodiments of the present invention merely indicates a specific example in carrying out the present invention, and the technical scope of the present invention is not to be construed in a limiting manner based on these. In other words, exemplary embodiments of the present invention can be implemented in various forms without departing from the technical idea or major features thereof.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, the operability of the continuum robot can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A continuum robot comprising:
   a base unit;
   a distal bending section configured to bend by driving a linear member for the distal bending section;
   a following bending section that is provided between the distal bending section and the base unit, and configured to bend by driving a linear member for the following bending section;
   a driving unit configured to independently drive the linear member for the distal bending section and the linear member for the following bending section;
   a moving unit configured to integrally move the base unit, the distal bending section, and the following bending section forward; and
   a control unit,
   wherein the control unit is configured to control, in accordance with a profile of a first bending angle regarding a bending angle of the following bending section that corresponds to a forward movement of the continuum robot, and is set in accordance with an input first target bending angle of the distal bending section, a bending angle of the following bending section to reach the first target bending angle, and wherein, in a case where a target bending angle of the distal bending section is changed from the first target bending angle to a second target bending angle before a displacement amount of the forward movement of the continuum robot reaches a first displacement amount that corresponds to a length of the following bending section while controlling the following bending section in accordance with the profile of the first bending angle and after the distal bending section bends at the first target bending angle;

the control unit is configured to set a profile of a second bending angle that is different from the profile of the first bending angle for the following bending section, and the control unit is configured to control the bending angle of the following bending section so that, by a further forward movement of the continuum robot, a bending angle of the following bending section reaches the second target bending angle in accordance with the profile of the second bending angle.

2. The continuum robot according to claim 1, wherein the control unit includes a storage unit configured to store a reference table indicating a relationship between a target bending angle of the distal bending section and a target bending angle of the following bending section, and a displacement of the base unit, and a rewriting unit configured to rewrite the reference table stored in the storage unit, in accordance with a change in a target bending angle of the distal bending section.

3. The continuum robot according to claim 2, wherein, in a case where a target bending angle of the distal bending section is changed from the first target bending angle to the second target bending angle in the reference table stored in the storage unit:

the rewriting unit generates a right triangle having a length of a base that corresponds to a length from a first displacement being a displacement of the base unit that is caused by the change, to a second displacement being a displacement progressed from the first displacement by a length of the following bending section, and having a height corresponding to a difference between the second distal bending angle and the first distal bending angle, and the rewriting unit rewrites the reference table by adding a value of a change in the bending angle from the bending angle corresponding to a point on a hypotenuse of the right triangle, to the bending angle corresponding to the base, to a value of a bending angle of the following bending section in the reference table stored in the storage unit, and setting a target bending angle of the following bending section that is obtained after the addition, as a target bending angle of the following bending section that is obtained after the change.

4. The continuum robot according to claim 2, wherein, in a case where a target bending angle of the distal bending section is changed from the first target distal bending angle to the second distal target bending angle in the reference table stored in the storage unit, the rewriting unit rewrites the reference table by interpolating, for a displacement range excluding a range from a displacement of the base unit at which a bending angle becomes the first distal bending angle, to a first displacement being a displacement corresponding to a sum of a length of the following bending section, from a range from a displacement of the base unit at which a bending angle becomes the second most distal bending angle, to a second displacement being a displacement corresponding to a sum of a length of the following bending section, a displacement between the first displacement and the second displacement at a target bending angle of the following bending section in the reference table with a value of the target bending angle on a straight line connecting a value of the first distal bending angle at the first displacement and a value of the second distal bending angle at the second displacement, and setting a target bending angle of the following bending section that is obtained after the interpolation, as a target bending angle of the following bending section that is obtained after the change.

5. The continuum robot according to claim 2, wherein, in a case where a target bending angle of the distal bending section is changed from a first distal bending angle to a second distal bending angle in the reference table stored in the storage unit, the rewriting unit rewrites the reference table by interpolating, for a displacement range from a first displacement being displacement of the base unit at which a bending angle becomes the second distal bending angle, to a second displacement being a displacement corresponding to a sum of a length of the following bending section, a displacement between the first displacement and the second displacement at a target bending angle of the following bending section in the reference table with a value of the target bending angle on a straight line connecting a value of a target bending angle of the following bending section at the first displacement and a value of the second distal bending angle at the second displacement, and setting a target bending angle of the following bending section that is obtained after the interpolation, as a target bending angle of the following bending section that is obtained after the change.

6. The continuum robot according to claim 2, wherein the storage unit stores a plurality of the different reference tables, and wherein the rewriting unit selects one reference table from among the plurality of reference tables, and rewrites the selected reference table.

7. A control method of a continuum robot including a base unit, a distal bending section configured to bend by driving a linear member for the distal bending section, and a following bending section that is provided between the distal bending section and the base unit and configured to bend by driving a linear member for the following bending section, wherein the base unit, the distal bending section, and the following bending section are integrally moved forward, the control method comprising:

controlling, in accordance with a profile of a first bending angle regarding a bending angle of the following bending section that corresponds to a forward movement of the continuum robot and is set in accordance with an input first target bending angle of the distal bending section, a bending angle of the following bending section to reach the first target bending angle;

receiving an operation instruction to change a target bending angle of the distal bending section from the first target bending angle to a second target bending angle before a displacement amount of the forward movement of the continuum robot reaches a first displacement amount that corresponds to a length of the following bending section while controlling the following bending section in accordance with the profile of the first bending angle and after the distal bending section bends at the first target bending angle;

setting a profile of a second bending angle that is different from the profile of the first bending angle for the following bending section; and controlling the bending angle of the following bending section so that, by a further forward movement of the continuum robot, a bending angle of the following bending section reaches the second target bending angle in accordance with the profile of the second bending angle.

8. A non-transitory storage medium storing a program for causing a computer to function as each unit of the continuum robot according to claim 1.

\* \* \* \* \*